United States Patent
Fidler et al.

(10) Patent No.: US 10,643,130 B2
(45) Date of Patent: May 5, 2020

(54) SYSTEMS AND METHODS FOR POLYGON OBJECT ANNOTATION AND A METHOD OF TRAINING AND OBJECT ANNOTATION SYSTEM

(71) Applicant: THE GOVERNING COUNCIL OF THE UNIVERSITY OF TORONTO, Toronto (CA)

(72) Inventors: Sanja Fidler, Toronto (CA); Amlan Kar, Toronto (CA); Huan Ling, Toronto (CA); Jun Gao, Toronto (CA); Wenzheng Chen, Toronto (CA); David Jesus Acuna Marrero, Toronto (CA)

( * ) Notice: Subject to any disclaimer, the term of this patent is extended or adjusted under 35 U.S.C. 154(b) by 0 days.

(21) Appl. No.: 16/363,354

(22) Filed: Mar. 25, 2019

(65) Prior Publication Data

US 2019/0294970 A1    Sep. 26, 2019

Related U.S. Application Data

(60) Provisional application No. 62/646,934, filed on Mar. 23, 2018, provisional application No. 62/783,251, filed on Dec. 21, 2018.

(51) Int. Cl.
*G06N 3/08* (2006.01)
*G06K 9/62* (2006.01)
*G06N 20/00* (2019.01)

(52) U.S. Cl.
CPC ........... *G06N 3/084* (2013.01); *G06K 9/6256* (2013.01); *G06N 20/00* (2019.01)

(58) Field of Classification Search
CPC ....... G06N 3/084; G06N 20/00; G06K 9/6256
See application file for complete search history.

(56) References Cited

U.S. PATENT DOCUMENTS

| | | | |
|---|---|---|---|
| 2018/0211155 A1* | 7/2018 | Bazrafkan | G06N 3/0454 |
| 2019/0000382 A1* | 1/2019 | Fitzpatrick | A61B 5/681 |
| 2019/0073774 A1* | 3/2019 | Kwant | G06K 9/4638 |
| 2019/0102908 A1* | 4/2019 | Yang | G06K 9/00335 |
| 2019/0188533 A1* | 6/2019 | Katabi | G01B 15/00 |
| 2019/0197682 A1* | 6/2019 | Hazan | G06T 7/0012 |

OTHER PUBLICATIONS

Castrejon et al., "Annotating Object Instances with a Polygon-RNN", (IEEE Conference on Computer Vision and Pattern Recognition (CVPR)), Apr. 18, 2017, pp. 5230-5238 (Year: 2017).*

(Continued)

*Primary Examiner* — Miranda M Huang
*Assistant Examiner* — Joseph V Nguyen
(74) *Attorney, Agent, or Firm* — Heer Law; Christopher D. Heer

(57) ABSTRACT

The present invention relates generally to object annotation, specifically to polygonal annotations of objects. Described are methods of annotating an object including steps of receiving an image depicting an object, generating a set of image features using a CNN encoder implemented on one or more computers, and producing a polygon object annotation via a recurrent decoder or a Graph Neural Network. The recurrent decoder may include a recurrent neural network, a graph neural network or a gated graph neural network. A system for annotating an object and a method of training an object annotation system are also described.

15 Claims, 18 Drawing Sheets

(56) References Cited

OTHER PUBLICATIONS

Li et al., "Gated Graph Sequence Neural Networks" (International Conference on Learning Representations (ICLR) 2016), correction published Sep. 22, 2017 (Year: 2017).*
Long et al., "Fully Convolutional Networks for Semantic Segmentation", (IEEE Conference on Computer Vision and Pattern Recognition (CVPR)), Apr. 2017, pp. 3431-3440 (Year: 2017).*
Li, Yujia. "Gated Graph Sequence Neural Networks." International Conference on Learning Representations (ICLR) 2016, published Sep. 22, 2017. (Year: 2017).*
L.Castrejon, K.Kundu, R.Urtasun, and S.Fidler. Annotating object instances with a polygon-rnn. In CVPR, 2017.
M.Bai and R.Urtasun. Deep watershed transform for instance segmentation. In CVPR, 2017.
Y. Boykov and M.-P. Jolly. Interactive graph cuts for optimal boundary & region segmentation of objects in nd images. In ICCV, 2001.
Y. Boykov and V. Kolmogorov. An experimental comparison of min-cut/max-flow algorithms for energy minimization in vision. T-PAMI, 26(9)1124-1137,2004.
L.-C. Chen, S. Fidler, A. Yuille, and R. Urtasun. Beat the mturkers: Automatic image labeling from weak 3d supervision. In CVPR, 2014.
L.-C. Chen, G. Papandreou, I. Kokkinos, K. Murphy, and A. L. Yuille. Semantic Image Segmentation with Deep Convolutional Nets and Fully Connected CRFs. In ICLR, 2015.
L.C.Chen, G.Papandreou, I.Kokkinos, K.Murphy, and A.L. Yuille. Deeplab: Semantic image segmentation with deep convolutional nets, atrous convolution, and fully connected crfs. T-PAMI, 40(4):834-848, Apr. 2018.
M. Cordts, M. Omran, S. Ramos, T. Rehfeld, M. Enzweiler, R. Benenson, U. Franke, S. Roth, and B. Schiele. The cityscapes dataset for semantic urban scene understanding. In CVPR, 2016.
L. Duan and F. Lafarge. Towards large-scale city reconstruction from satellites. In ECCV, 2016.
A. Geiger, P. Lenz, and R. Urtasun. Are we ready for Autonomous Driving? The KITTI Vision Benchmark Suite. In CVPR, 2012.
S. Gerhard, J. Funke, J. Martel, A. Cardona, and R. Fetter. Segmented anisotropic ssTEM dataset of neural tissue. figshare, 2013.
K.He, G.Gkioxari, P.Dollár, and R.Girshick. MaskR-CNN. ICCV, 2017.
K. He, X. Zhang, S. Ren, and J. Sun. Deep residual learning for image recognition. In CVPR, 2016.
J.Huang,V.Rathod, C.Sun, M.Zhu, A.Korattikara, A.Fathi, I.Fischer, Z.Wojna, Y.Song, S.Guadarrama, and K.Murphy. Speed/accuracy trade-offs for modern convolutional object detectors. In CVPR, pp. 3296-3297, Jul. 2017.
S. Ioffe and C. Szegedy. Batch normalization: Accelerating deep network training by reducing internal covariate shift. In ICML, pp. 448-456,2015.
A.H.Kadish, D.Bello, J.P.Finn, R.O.Bonow, A.Schaechter, H. Subacius, C. Albert, J. P. Daubert, C. G. Fonseca, and J. J. Goldberger. Rationale and Design for the Defibrillators to Reduce Risk by Magnetic Resonance Imaging Evaluation (DETERMINE) Trial. J Cardiovasc Electrophysiol, 20(9):982-7, 2009.
K. Li, B. Hariharan, and J. Malik. Iterative instance segmentation. In CVPR, 2016.
Y. Li, D. Tarlow, M. Brockschmidt, and R. Zemel. Gated graph sequence neural networks. In ICLR, 2016.
S. Liu, J. Jia, S. Fidler, and R. Urtasun. Sequential grouping networks for instance segmentation. In ICCV, 2017.
J. Long, E. Shelhamer, and T. Darrell. Fully Convolutional Networks for Semantic Segmentation. In CVPR, 2015.
N. S. Nagaraja, F. R. Schmidt, and T. Brox. Video segmentation with just a few strokes. In ICCV, 2015.
P. O. Pinheiro, R. Collobert, and P. Dollar. Learning to segment object candidates. In NIPS, pp. 1990-1998,2015.
P.O.Pinheiro, T.-Y.Lin, R.Collobert, and P.Dollár. Learning to refine object segments. In ECCV, 2016.

T. Pohlen, A. Hermans, M. Mathias, and B. Leibe. Fullresolution residual networks for semantic segmentation in street scenes. CVPR, 2017.
X. Qi, R. Liao, J. Jia, S. Fidler, and R. Urtasun. 3d graph neural networks for rgbd semantic segmentation. In ICCV, 2017.
M. Rajchl, M. C. Lee, O. Oktay, K. Kamnitsas, J. PasseratPalmbach, W. Bai, M. Damodaram, M. A. Rutherford, J. V. Hajnal, B. Kainz, and D. Rueckert. Deepcut: Object segmentation from bounding box annotations using convolutional neural networks. In IEEE Trans. on Medical Imaging, 2017.
M. Ranzato, S. Chopra, M. Auli, and W. Zaremba. Sequence level training with recurrent neural networks. ICLR, 2016.
S. Ren, K. He, R. Girshick, and J. Sun. Faster R-CNN: Towards real-time object detection with region proposal networks. In NIPS, 2015.
S. J. Rennie, E. Marcheret, Y. Mroueh, J. Ross, and V. Goel. Self-critical sequence training for image captioning. CVPR, 2017.
B. Romera-Paredes and P. H. S. Torr. Recurrent instance segmentation. In arXiv:1511.08250, 2015.
C. Rother, V. Kolmogorov, and A. Blake. Grabcut: Interactive foreground extraction using iterated graph cuts. In SIGGRAPH, 2004.
F. Scarselli, M. Gori, A. C. Tsoi, M. Hagenbuchner, and G. Monfardini. The Graph Neural Network Model. IEEE Trans. on Neural Networks, 20(1):61-80, 2009.
A. Suinesiaputra, B. R. Cowan, A. O. Al-Agamy, M. A. Elattar, N. Ayache, A. S. Fahmy, A. M. Khalifa, P. MedranoGracia, M.-P. Jolly, A. H. Kadish, D. C. Lee, J. Margeta, S. K. Warfield, and A. A. Young. A collaborative resource to build consensus for automated left ventricular segmentation of cardiac MR images. Medical Image Analysis, 18(1):50-62, 2014.
X.Sun, C.M.Christoudias, and P.Fua. Free-shapepolygonal object localization. In ECCV, 2014.
S. Wang, M. Bai, G. Mattyus, H. Chu, W. Luo, B. Yang, J. Liang, J. Cheverie, S. Fidler, and R. Urtasun. Toronto city: Seeing the world with a million eyes. In ICCV, 2017.
R. J. Williams. Simple statistical gradient-following algorithms for connectionist reinforcement learning. In Machine Learning, 1992.
S. Xingjian, Z. Chen, H. Wang, D.-Y. Yeung, W.-k. Wong, and W.-c. Woo. Convolutional lstm network: A machine learning approach for precipitation nowcasting. In NIPS, pp. 802-810, 2015.
F. Yu and V. Koltun. Multi-scale context aggregation by dilated convolutions. ICLR, 2016.
Z. Zhang, S. Fidler, and R. Urtasun. Instance-level segmentation for autonomous driving with deep densely connected mrfs. In CVPR, 2016.
Z. Zhang, S. Fidler, J. W. Waggoner, Y. Cao, J. M. Siskind, S. Dickinson, and S. Wang. Super-edge grouping for object localization by combining appearance and shape information. In CVPR, 2012.
Z. Zhang, A. Schwing, S. Fidler, and R. Urtasun. Monocular object instance segmentation and depth ordering with cnns. In ICCV, 2015.
H. Zhao, J. Shi, X. Qi, X. Wang, and J. Jia. Pyramid scene parsing network. In CVPR, 2017.
B. Zhou, H. Zhao, X. Puig, S. Fidler, A. Barriuso, and A. Torralba. Scene parsing through ade20k dataset. In CVPR, 2017.
D. Acuna, A. Kar, and S. Fidler. Devil is in the edges: Learning semantic boundaries from noisy annotations. In CVPR, 2019.
D. Acuna, H. Ling, A.Kar, and S. Fidler. Efficient interactive annotation of segmentation datasets with polygon-rnn++. In CVPR, 2018.
M. M. Bronstein, J. Bruna, Y. LeCun, A. Szlam, and P. Vandergheynst. Geometric deep learning: going beyond euclidean data. In CVPR, 2017.
D. Cremers, O. Fluck, M. Rousson, and S. Aharon. A probabilistic level set formulation for interactive organ segmentation. In SPIE, 2007.
K.-K. Maninis, et al. Deep Extreme Cut: From Extreme Points to Object Sementation; Computer Vision Lab.
J. Gao, C. Tang, V. Ganapathi-Subramanian, J. Huang, H. Su, and L. J. Guibas. Deepspline: Data-driven reconstruction of parametric curves and surfaces. arXiv preprint arXiv:1901.03781, 2019.

(56) References Cited

OTHER PUBLICATIONS

P. Krähenbühl and V. Koltun. Geodesic object proposals. In D. Fleet, T. Pajdla, B. Schiele, and T. Tuytelaars, editors, ECCV, pp. 725-739, 2014.
S. Liu, L. Qi, H. Qin, J. Shi, and J. Jia. Path aggregation network for instance segmentation. In CVPR, 2018.
M. M. Loper and M. J. Black. Opendr: An approximate differentiable renderer. In D. Fleet, T. Pajdla, B. Schiele, and T. Tuytelaars, editors, ECCV, pp. 154-169, 2014.
D. Marcos, D. Tuia, B. Kellenberger, L. Zhang, M. Bai, R. Liao, and R. Urtasun. Learning deep structured active contours end-to-end. In CVPR, pp. 8877-8885, 2018.
F. Perazzi, J. Pont-Tuset, B. McWilliams, L. V. Gool, M. Gross, and A. Sorkine-Hornung. A benchmark dataset and evaluation methodology for video object segmentation. In the IEEE Conference on Computer Vision and Pattern Recognition (CVPR), 2016.
H. Prautzsch, W. Boehm, and M. Paluszny. Bézier and Bspline techniques. Springer Science & Business Media, 2013.
J. H. Tan and U. R. Acharya. Active spline model: a shape based model interactive segmentation. Digital Signal Processing, 35:64-74, 2014.
N. Wang, Y. Zhang, Z. Li, Y. Fu, W. Liu, and Y. Jiang. Pixel2mesh: Generating 3d mesh models from single RGB images. In ECCV, vol. 11215, pp. 55-71. Springer, 2018.
C. Yuksel, S. Schaefer, and J. Keyser. Parameterization and applications of catmull-rom curves. Computer-Aided Design, 43(7):747-755, 2011.
D.ShreinerandT.K.O.A.W.Group. OpenGLProgramming Guide: The Official Guide to Learning OpenGL, Versions 3.0 and 3.1. Addison-Wesley Professional, 7th edition, 2009.

* cited by examiner

SYSTEMS AND METHODS FOR POLYGON OBJECT ANNOTATION AND A METHOD OF TRAINING AND OBJECT ANNOTATION SYSTEM

FIELD OF THE INVENTION

The present specification relates generally to object annotation, specifically to polygonal annotations of objects.

BACKGROUND OF THE INVENTION

Detailed reasoning about structures or objects in images is helpful in numerous computer vision applications. For example, it is often critical in the domain of autonomous driving to localize and outline all cars, pedestrians, and miscellaneous static and dynamic objects. For mapping, there is often a need to obtain detailed footprints of buildings and roads from aerial or satellite imagery, while medical and healthcare domains often require automatic methods to precisely outline cells, tissues and other relevant structures.

Neural networks are sometimes an effective way of inferring semantic and object instance segmentation information in challenging imagery. Often, the amount and variety of data that the networks see during training drastically affects their performance at run time. Collecting ground truth instance masks, however, may be an extremely time-consuming task, such as requiring human annotators to spend 20-30 seconds per object in an image.

As object instance segmentation may be time consuming to annotate manually, several approaches seek to speed up this process using interactive techniques. In some approaches, scribbles are used to model the appearance of foreground and background, and segmentation is performed via graph-cuts. Some approaches use multiple scribbles on both the object and background, and have been used to annotate objects in videos.

In some approaches, scribbles are used to train convolutional neural networks ('CNN') for semantic image segmentation. In one approach, called GrabCut, 2D bounding boxes provided by an annotator are exploited, and pixel-wise foreground and background labeling is performed using expectation maximization ('EM'). In some approaches, GrabCut is combined with convnets to annotate structures in imagery. In some approaches, pixel-wise segmentation of cars is performed by exploiting 3D point clouds inside user-provided 3D bounding boxes.

Many approaches to object instance segmentation operate on the pixel-level. Many rely on object detection, and use a convnet over a box proposal to perform the labeling. Although in some works, a polygon is produced around an object. Some approaches first detect boundary fragments, followed by finding an optimal cycle linking the boundaries into object regions. Some approaches produce superpixels in the form of small polygons which are further combined into an object.

In some approaches, polygon object representation has been introduced as an alternative to labeling each individual pixel. One benefit of polygon object representation is that it is sparse; only a few vertices of a polygon represent large image regions. For example, this may allow the user to easily introduce any correction, by correcting the wrong vertices. A recurrent neural network ('RNN') may further provide a strong model as it captures non-linear representation of shape, thus effectively capturing typical shapes of objects. This may be particularly important in ambiguous cases such as imagery containing shadows and saturation.

For example, Polygon-RNN is a conceptual model for semi-automatic and interactive labeling to help speed up object annotation. Instead of producing pixel-wise segmentation of an object, as is done in some interactive tools such as Grabcut, Polygon-RNN predicts the vertices of a polygon that outlines the object. Polygon representation may provide several benefits; it is sparse with only a few vertices representing regions with a large number of pixels, it may be easier for an annotator to interact with, and the model may be able to directly take annotator inputs to re-predict a better polygon that is constrained by the corrections. In some embodiments, polygon representation models have shown high annotation speed-ups on autonomous driving datasets.

Further improved polygon representation models may further speed up annotation time, improve neural network learning from polygon representation models, and increase the output resolution of polygons.

SUMMARY OF THE INVENTION

In an embodiment of the present invention, there is provided a method of annotating an object, comprising: receiving an image depicting an object; generating a set of image features using a CNN encoder implemented on one or more computers; predicting a set of first vertex predictions using the set of image features; producing a set of polygon representations of the object using a recurrent decoder that exploits the set of first vertex predictions and the set of image features, the recurrent decoder including a RNN implemented on one or more computers; and selecting a polygon object annotation from the set of polygon representations using an evaluator network.

In an embodiment of the present invention, there is provided a system for object annotation, comprising: a CNN encoder implemented by one or more computers for generating image features from a received image, the image features for predicting a first vertex of an object annotation; a recurrent decoder for generating a set of polygon representations of an object in the received image, the recurrent decoder including a RNN implemented by one or more computers; and an evaluator network for selecting a polygon object annotation from the set of polygon representations.

In an embodiment of the present invention, there is provided a method of training an object annotation system having a CNN encoder, an RNN recurrent decoder and an evaluator network, comprising: receiving a training dataset; initiating a training sequence for setting one or more weight matrices of the object annotation system using managed learning environment training, such as maximum likelihood learning; and fine-tuning the one or more weight matrices of the object annotation system using reinforcement learning to produce a trained object annotation system.

In a further embodiment of the present invention, there is provided a method of annotating an object, comprising: receiving an image depicting an object, the image comprising an n-dimensional array-like data structure; generating a set of image features using a CNN encoder implemented on one or more computers; initializing a set of N nodes from the set of image features, the set of N nodes forming a closed curve along a circle centered in the image; predicting a location shift for each node simultaneously using a Graph Neural Network (GNN); iterating predictions through the GNN for each node, each iteration defining a new location shift for each node based on node locations for each node from the previous iteration; and producing an object annotation based on a final iteration; wherein the object is parametrized with one of polygons and splines.

In a further embodiment of the present invention, there is provided a system for object annotation, comprising: a Convolutional Neural Network (CNN) encoder implemented by one or more computers for generating a set of image features from a received image, the image comprising an n-dimensional array-like data structure, and for initializing a set of N nodes from the set of image features, the set of N nodes forming a closed curve along a circle centered in the image; a Graph Neural Network (GNN) implemented by one or more computers for predicting a location shift for each node simultaneously and iterating predictions through the GNN for each node, each iteration defining a new location shift for each node based on node locations for each node from the previous iteration; and an output selector for producing an output based on a final iteration from the GNN.

In a further embodiment of the present invention, there is provided a non-transient computer-readable medium comprising instructions for a method of annotating an object, the method comprising: receiving an image depicting an object, the image comprising an n-dimensional array-like data structure; generating a set of image features using a CNN encoder implemented on one or more computers; predicting a set of first vertex predictions using the set of image features; producing a set of polygon predictions of the object using a recurrent decoder that exploits the set of first vertex predictions and the set of image features, the recurrent decoder implemented on one or more computers; and selecting a polygon object annotation from the set of polygon predictions.

In a further embodiment of the present invention, there is provided a non-transient computer-readable medium comprising instructions for a method of annotating an object, the method comprising: receiving an image depicting an object, the image comprising an n-dimensional array-like data structure; generating a set of image features using a CNN encoder implemented on one or more computers; initializing a set of N nodes from the set of image features, the set of N nodes forming a closed curve along a circle centered in the image; predicting a location shift for each node simultaneously using a Graph Neural Network (GNN); iterating predictions through the GNN for each node, each iteration defining a new location shift for each node based on node locations for each node from the previous iteration; and producing an object annotation based on a final iteration; wherein the object is parametrized with one of polygons and splines.

In a yet further embodiment of the present invention, there is provided a non-transient computer-readable medium comprising instructions for a method of training an object annotation system having a CNN encoder, an RNN recurrent decoder and an evaluator network, the method comprising: receiving a training dataset; initiating a training sequence for setting one or more weight matrices of the object annotation system using managed learning environment training; and fine-tuning the one or more weight matrices of the object annotation system to produce a trained object annotation system.

BRIEF DESCRIPTION OF THE FIGURES

The principles of the invention may better be understood with reference to the accompanying figures provided by way of illustration of an exemplary embodiment, or embodiments, incorporating principles and aspects of the present invention, and in which.

DETAILED DESCRIPTION OF EMBODIMENTS OF THE INVENTION

Figure 1:
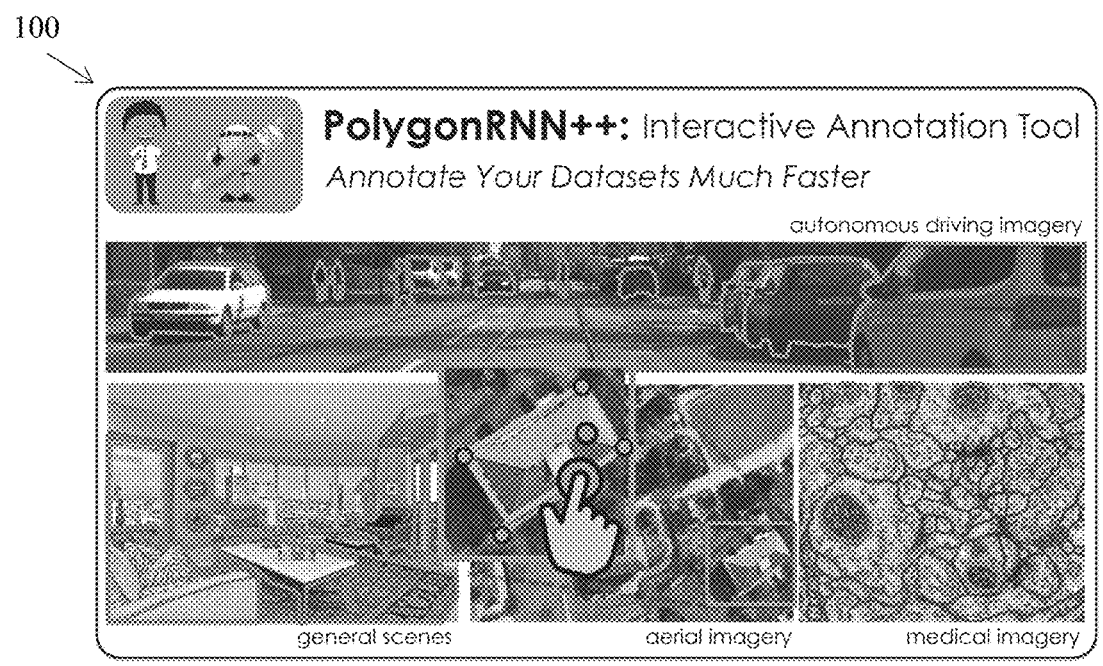
FIG. 1 shows examples of four dataset images.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order to more clearly to depict certain features of the invention.

This description relates to improvements in polygon representation models for object recognition, such as improvements to the Polygon-RNN model disclosed in D1 (L. Castrejon, K Kundu, R. Urtasun, and S. Fidler. *Annotating object instances with a polygon-rnn. In CVPR*, 2017), the entirety of which is hereby incorporated by reference. In particular, it relates to changes to the neural network architecture, a new learning algorithm to train polygon models using reinforcement learning, and increasing the output resolution of the polygon using a Graph Neural Network. This description also relates to the robustness of polygon models with respect to noise, and their generalization capabilities to out-of-domain imagery.

The present description relates to a fully automatic mode, in which an annotator is not in the loop, and a partially automatic mode, in which an annotator is in the loop. In a fully automatic mode, with no annotator in the loop, changes disclosed herein to existing polygon models may result in improved Intersection over Union (IoU). In an interactive mode, with an annotator in the loop, changes to existing polygon models may allow for significantly less human annotator clicks.

The present description relates to online fine-tuning to achieve a higher annotation speed-up, such as on out-of-domain dataset annotation.

As shown at 1000 in FIG. 1, a polygon object recognition model may be applied to a variety of dataset domains, including autonomous driving imagery, medical imagery, and aerial imagery, and may also be applied to other general scenes. In this sense, an image is n-dimensional array-like data structure provided as an input to the system. This input may be received as sensor data in the appropriate format, and known image types that may be input include RGB images, thermal images, depth images and hyperspectral images.

1. The Present Model

An embodiment of the present application is an improved version of the Polygon-RNN model disclosed in D1; Polygon-RNN++. Polygon-RNN++ expects an annotator to provide a bounding box around an object of interest in a figure. The polygon object recognition model then extracts an image crop enclosed by an enlarged box, where the enlarged box is the annotator-provided bounding box enlarged by 15%.

In some embodiments, the polygon model exploits a CNN and RNN architecture, with a CNN serving as an image feature extractor, and the RNN decoding one polygon vertex at a time. Output vertices may be represented as a location in a grid.

Figure 2:
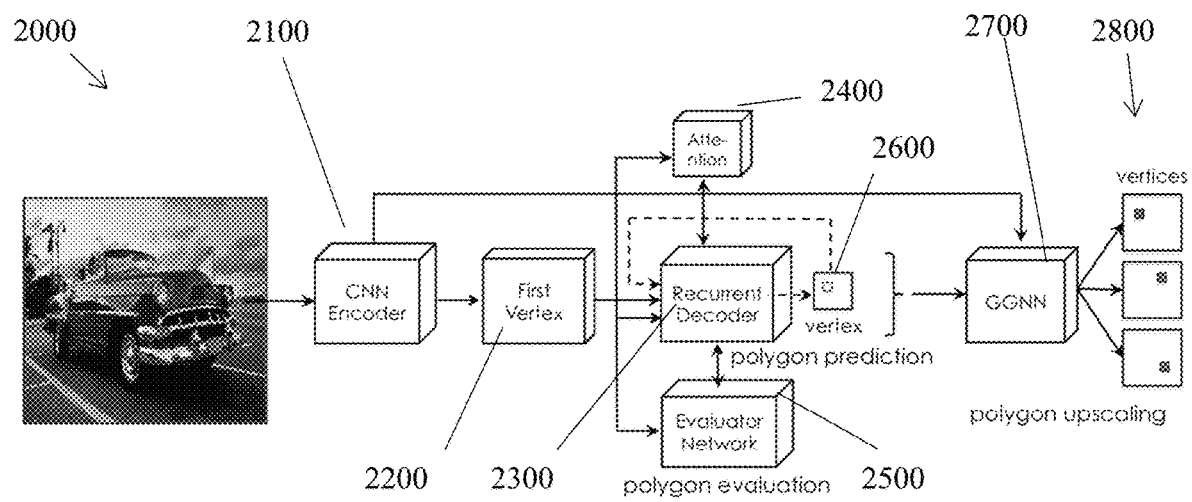
FIG. 2 shows a schematic diagram of aspects of an embodiment.

In the embodiment 2000 depicted in schematic form in FIG. 2, an encoder 2100 generates image features that are used to predict the first vertex 2200. The first vertex 2200 and the image features are used by the recurrent decoder 2300. This uses visual attention 2400 at each time step to produce a polygon one vertex 2600 at a time. A learnt evaluator network 2500 selects the best polygon out of candidates proposed by the decoder 2300. Finally, a graph neural network 2700 generates polygons at a higher resolution, defined by vertices 2800.

This model naturally incorporates a human in the loop, allowing the annotator to correct an erroneously predicted vertex. This vertex is then fed back to the model, helping the model to correct its prediction at the next time steps.

1.1. Residual Encoder with Skip Connections

Many networks perform repeated down-sampling operations at consecutive layers of a CNN, which impacts the effective output resolution in tasks such as image segmentation. However, in some embodiments, such as architecture 3000 depicted in FIG. 3, a ResNet-50 architecture is modified by reducing the stride of the network and introducing dilation factors, which allows for an increase in the resolution of the output feature map without reducing the receptive field of individual neurons. The original average pooling and fiber channel ('FC') layers may also be removed.

Figure 3:
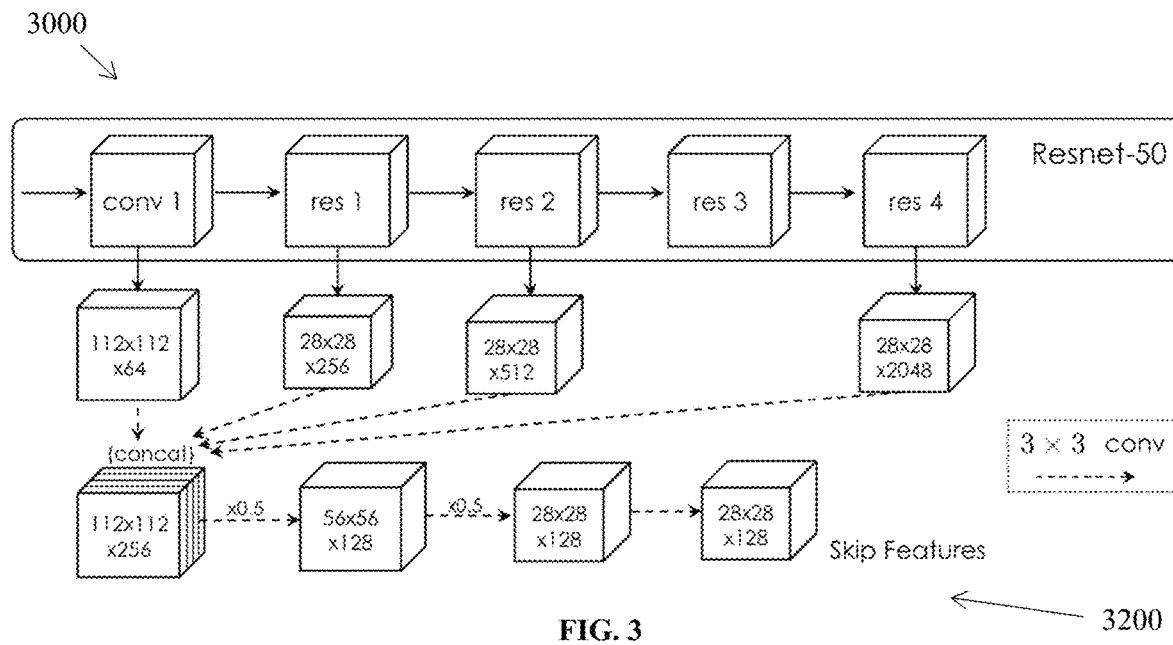
FIG. 3 shows a schematic diagram of aspects of an embodiment.

Some embodiments of the present invention further include a skip-layer architecture which aims to capture both low-level details, such as edges and corners, as well as high-level semantic information. In some models down-sampling is performed in the skip-layer architecture, built on top of Visual Geometry Group ('VGG'), before concatenating the features from different layers. However, in embodiments of the present invention, all the outputs of the skip layers are concatenated at the highest possible resolution, and a combination of cony layers and max-pooling operations are used to obtain the final feature map. For example, cony filters with a kernel size of 3×3, batch normalization and ReLU (rectified non-linear units) non-linearities may be employed. In cases where the skip-connections have different spatial dimensions, bilinear upsampling may be used before concatenation. Representative architecture 3000 is depicted in FIG. 3, wherein the final feature map is referred to as the skip features 3200.

1.2. Recurrent Decoder

As in D1, embodiments of the present application use a Recurrent Neural Network to model the sequence of 2D vertices of the polygon outlining an object. In some embodiments, Convolutional Long Short-Term Memory ('LSTM') is also used to preserve spatial information and to reduce the number of parameters to be learned.

Embodiments of the present application use a two-layer ConvLTSM with a 3 by 3 kernel with 64 and 16 channels, respectively. Batch norm is applied at each time step, without sharing mean or variance estimates across time steps. Output at time step t is represented as one-hot encoding of (D×D)+1 elements, where D is the resolution predicted. For example, D may be set to 28. The first D×D dimensions represent the possible vertex positions and the last dimension corresponds to the end-of-seq token that signals that the polygon is closed.

Attention Weighted Features:

A mechanism akin to attention may be exploited in an RNN. For example, at time step t the weighted feature map may be computed as in equation (1), where ○ is the Hadamard product, x is the skip feature tensor, and $h_{1,t}$ and $h_{2,t}$ are the hidden state tensors from the two-layer ConvLSTM. $f_1$ and $f_2$ map $h_{1,t}$ and $h_{2,t}$ to $R^{D \times D \times 128}$ using one fully-connected layer. $f_{att}$ takes the sum of its inputs and maps it to D×D through a fully connected layer, giving one "attention" weight per location.

$$\alpha_t = \mathrm{softmax}(f_{att}(x, f_1(h_{1,t-1}), f_2(h_{2,t-1})))$$

$$F_t = x \circ \alpha_t \quad (1)$$

In some embodiments, the previous RNN hidden state is used to gate certain locations in the image feature map, allowing the RNN to focus only on the relevant information in the next time step. The gated feature map $F_t$ is then concatenated with one-hot encodings of the two previous vertices $y_{t-1}$, $y_{t-2}$ and the first vertex $y_0$, and passed to the RNN at time step t.

First Vertex:

In some embodiments, given a previous vertex and an implicit direction, the next vertex of a polygon is always uniquely defined, except for the first vertex. The first vertex may be treated as a special case. In some embodiments it may be predicted using an additional architecture, trained separately. In some embodiments, another branch may be added from the skip-layer architecture, constituting of two layers, each of dimensions D×D, the first layer predicting edges, while the second predicts the vertices of the polygon, with the first vertex sampled from the final layer of this branch.

1.3. Training Using Reinforcement Learning

Training a model using the cross-entropy loss at each time step may have two limitations; managed learning environment ('MLE') over-penalizes the model (for example when the predicted vertex is on an edge of the GT polygon but is not one of the GT vertices), and it optimizes a metric that is very different from the final evaluation metric (i.e. IoU). Training a model using 'teacher forcing' in which a model is trained following a typical training regime where the GT vertex is fed to the next time step instead of the model's prediction, may create a mismatch between training and testing known as the exposure bias problem.

While such training techniques could be used in some embodiments, in other embodiments MLR training may only be used as an initialization stage. The polygon prediction task is reformulated as a reinforcement learning problem and the network is fine-tuned using reinforcement learning ('RL'). During this phase, the network is allowed to discover policies that optimize the desirable, yet non-differentiable evaluation metric (IoU) while also exposing it to its own predictions during training.

1.3.1 Problem Formulation

In embodiments, the recurrent decoder is viewed as a sequential decision making agent. The parameters θ of the encoder-decoder architecture define its policy $p_\theta$ for the selection of the next vertex $v_t$. At the end of the sequence, the agent observes a reward r. The reward r is computed as the IoU between the mask enclosed by the generated polygon and the ground-truth mask. To maximize the expected reward, our loss function becomes function (2).

$$l(\theta) = -\mathbb{E}_{v^s \sim p_\theta}[r(v^s, m)] \quad (2)$$

Where $v^s = (v_1^s, \ldots, v_T^s)$, and $v_t^s$ is the vertex sampled from the model at time t. Here, m is the ground truth mask for the given object instance and r=IoU(mask($v^s$),m).

1.3.2. Self-Critical Training with Policy Gradients

Some embodiments using the REINFORCE approach to compute the gradients of the expectation result in function (3).

$$\nabla L(\theta) = -\mathbb{E}_{v^s \sim p_\theta}[r(v_s, m)\nabla \log p_\theta(v_s)] \quad (3)$$

Some embodiments use Monte-Carlo sampling with a single sample to compute the expected gradient. This approach may exhibit high variance and may be highly unstable without proper context-dependent normalization. In some embodiments a learned baseline may be used, and may be subtracted from the reward. In some embodiments the self-critical method may followed, and the test-time inference reward of the model is used as the baseline. Accordingly, the gradient of the loss function may be reformulated as function (4).

$$\nabla L(\theta) = -[(r(v_s, m) - r(\hat{v}_s, m))\nabla \log p_\theta(v_s)] \quad (4)$$

Where r($\hat{v}_s$, m) is the reward obtained by the model using greedy decoding.

To control the level of randomness in the vertices explored by the model, in some embodiments a temperature parameter τ is introduced in the softmax operation that gets the probability distribution of the policy. This ensures that the sampled vertices lead to well-behaved polygons. For example, τ may be set to 0.6.

1.4. Evaluator Network

A well-chosen first vertex may be important as it biases the initial predictions of the RNN, when the model does not have a strong history to reason about the object to annotate. This may be particularly important in cases of occluding objects. It may be desirable for the first vertex to be far from the occlusion boundaries so that the model follows the object of interest. In RNNs, beam search may be used to prune off improbable sequences (such as when the model starts to follow an occluding object). However, since classical beam search uses log probabilities to evaluate beams, it may not directly apply to a model which aims to optimize IoU. A point on an occlusion boundary may exhibit a strong edge and thus may have a high log probability during prediction, reducing the chances of it being pruned by beam search.

Figure 4:
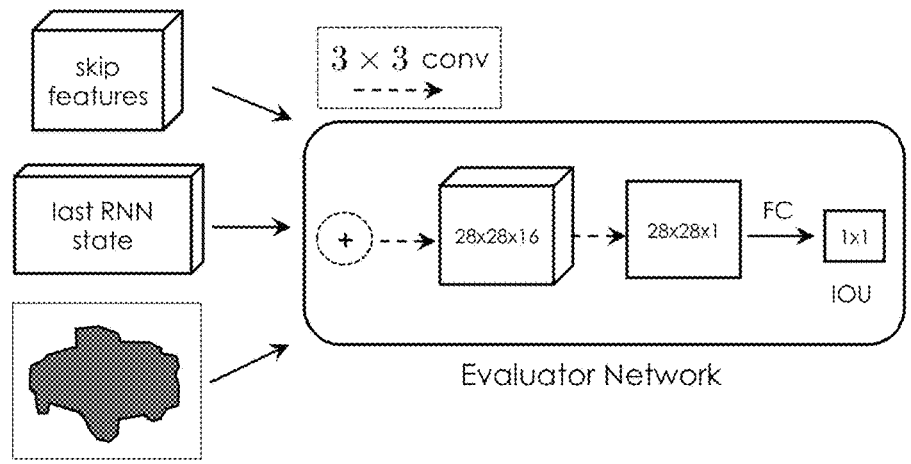
FIG. 4 shows a schematic diagram of aspects of an embodiment.

A solution to this problem may be to use an evaluator network at inference time, aiming to effectively choose among multiple candidate polygons. An evaluator network takes as input the skip features, the last state tensor of the ConvLSTM, and the predicted polygon, and tries to estimate its quality by predicting its IoU with Gamma Testing ('GT'). The network may have two 3×3 convolutional layers followed by a FC layer, forming another branch in the model. The architecture of an embodiment evaluator network is depicted in FIG. 4. While the full model may be trained end-to-end during the RL step, in some embodiments the evaluator network may be trained separately after the RL fine-tuning has converged.

During training, the mean squared error of function (5) may be minimized.

$$L = [p - IoU(m_{v_s}, m)]^2 \quad (5)$$

Where p is the network's predicted IoU, $m_{v_s}$ is the mask for the sampled vertices and m is the ground-truth mask. To ensure diversity in the vertices seen, polygons may be sampled with τ=0.3. In embodiments, this network is not used as a baseline estimator during the RL training step as the self-critical method may produce better results.

Inference:

At test time, K top scoring first vertex predictions may be taken. For each of these, polygons are generated via classical beam-search (using log probability). This yields K different polygons, one for each first vertex candidate. The evaluator network may be used to choose the best polygon. For example, K=5 may be used. While one could use the evaluator network instead of beam-search at each time step, this may lead to impractically long inference times. For example, it may be desired to run a model at 36 ms per object instance on a Titan XP.

Annotator in the Loop:

Where an annotator is in the loop, the annotator may correct the vertices in sequential order. Each correction may then be fed back to the model, which may re-predict the rest of the polygon.

1.5. Upscaling with a Graph Neural Network

The model disclosed above may produce polygons at a resolution of D×D. For example, D may be set to 28 to satisfy memory bounds and to keep the cardinality of the output space amenable. In other embodiments, a Gated Graph Neural Network (GGNN) may be used, in order to generate polygons at a much higher resolution. When training the RNN decoder, the GT polygons may be simplified at their target resolution (co-linear vertices are removed) to alleviate the ambiguity of the prediction task. Thus, at a higher resolution, the object may have additional corners (vertices), effectively changing the topology of the polygon.

Figure 5:
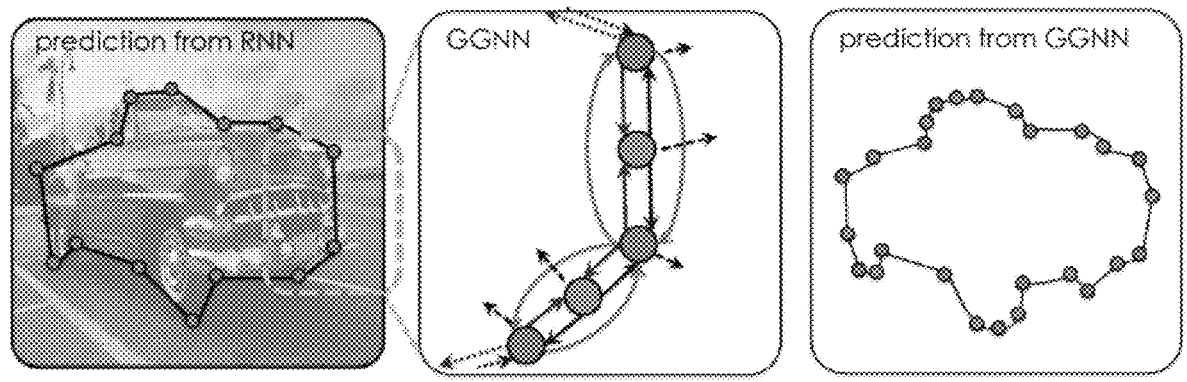
FIG. 5 shows a schematic diagram of aspects of an embodiment.

Some embodiments build on top of the sequence of polygon vertices generated by the RNN decoder. These vertices are treated as nodes in a (cycle) graph. To account for the change in geometry at a higher resolution, a node is added in between two consecutive nodes, with its location being in the middle of their corresponding edge. The last and the first vertex are also connected, effectively converting the sequence into a cycle. Neighboring nodes are connected using 3 different types of edges, as shown in FIG. 5. GGNN then defines a propagation model that extends RNNs to arbitrary graphs, effectively propagating information between nodes, before producing an output at each node. Here, the aim is to predict the relative offset of each node (vertex) at a higher resolution. As such, GGNN allows for an improvement in predictions, both for the initial vertices of the polygon where the RNNs history took less effect, as well as effectively upscaling old and new vertices. The model is visualized in FIG. 5.

Gated Graph Neural Network:

For completeness, the GGNN model is summarized. GGNN uses a graph $\{V, E\}$, where V and E are the sets of nodes and edges, respectively. It includes a propagation model performing message passing in the graph, and an output model for prediction tasks. The initial state of a node v is represented as $x_v$, and the hidden state of node v at time step t as $h_v^t$. The basic recurrence of the propagation model is set out in function (6).

$$h_v^0 = [x_v^T, 0]^T$$

$$a_v^t = A_v^T [h_1^{t-1^T}, \ldots, h_{|V|}^{t-1^T}]^T + b$$

$$h_v^t = f_{GRU}(h_v^{t-1}, a_v^t) \quad (6)$$

Where the matrix $A \in \mathbb{R}^{|V| \times 2N|V|}$ determines how the nodes in the graph communicate with each other, where N represents the number of different edge types. Messages are propagated for T steps. The output for node v is then defined as in function (7).

$$h_v = \tan(f_1(h_v^T))$$

$$\text{out}_v = f_2(h_v) \quad (7)$$

Where $f_1$ and $f_2$ are MLP, and $\text{out}_v$ is v's desired output.

PolygonRNN++ with GGNN:

To obtain initial observations for the GGNN model, another branch may be added on top of the skip-layer architecture, in particular from the 112×112×256 feature map, such as the concat feature map of FIG. 4. A conv layer with 256 filters of size 15×15 may be exploited, giving a feature map of size 112×112×256. For each node v in the graph, a S×S patch around the scaled $(v_x, v_y)$ location may be extracted, giving the observation vector $x_v$. The output of a node v is a location in a D'×D' spatial grid. This grid may be made relative to the location $(v_x, v_y)$, rendering the prediction task to be a relative displacement with respect to its initial position. This prediction is treated as a classification task and the model is trained with the cross entropy loss. In particular, the predictions from the RNN model may be taken, and a wrong prediction corrected if it deviates from the GT vertex by more than a threshold. The targets at training are then the relative displacements of each of these vertices with respect to GT.

Implementation Details:

In an embodiment, S is set to 1 and D' to 112. While the model may support much higher output resolutions, a larger D' may not justifiably improve results. The hidden state of the GRU in the GGNN has 256 dimensions. T=5 propagation steps may be used. In the output model, $f_1$ is a 256×256 FC layer and $f_2$ is a 256×15×15 MLP. In training, the predictions from the RNN are taken, and the vertices are replaced with GT vertices if they deviate by more than 3 cells.

1.6. Annotating New Domains Via Online Fine-Tuning

To simulate annotation of a completely new dataset, building off of a model trained on another, an online fine-tuning scheme may be used, which exploits a human-in-the-loop for annotation. Where C is the number of chunks the new data is divided into, CS is the chunk size, $N_{EV}$ is the number of training steps for the evaluator and $N_{MLE}$, $N_{RL}$ are the number of training steps for each chunk with MLE and RL, respectively. An example online fine-tuning is described in Algorithm 1 where PredictAndCorrect refers to the (simulated) annotator in the loop. Where training is on corrected data, the targets for MLE training may be smoothed with a manhattan distance transform truncated at distance 2.

---

Algorithm 1: Online Fine Tuning on New Datasets

```
bestPoly = cityscapesPoly;
while currChunk in (1..C) do
  | rawData = readChunk(currChunk);
  | data = PredictAndCorrect(rawData, bestPoly);
  | data += SampleFromSeenData(CS);
  | newPoly = Train_MLE(data, N_MLE, bestPoly);
  | newPoly = Train_RL (data, N_RL, newPoly);
  | newPoly = Train_EV (data, N_EV, newPoly);
  | bestPoly = newPoly;
end
```

---

2. Experimental Results

Herein is presented an evaluation of embodiments of the model described above. Both automatic and interactive instances of annotation results on the Cityscapes dataset presented in D2 (M Cordts, M Omran, S. Ramos, T Rehfeld, M Enzweiler, R. Benenson, U. Franke, S. Roth, and B. Schiele. *The cityscapes dataset for semantic urban scene understanding. In CVPR,* 2016) are discussed and compared to strong pixel-wise methods. The generalization capability of the model is then characterized with evaluation on the KITTI dataset presented in D3 (A. Geiger, P. Lenz, and R. Urtasun. *Are we ready for Autonomous Driving? The KITTI Vision Benchmark Suite. In CVPR,* 2012) and four out-of-domain datasets spanning general scenes presented in D4 (B. Zhou, H. Zhao, X Puig, S. Fidler, A. Barriuso, and A. Torralba. *Scene parsing through ade20k dataset. In CVPR,* 2017), aerial scenes presented in D5 (X Sun, C. M Christoudias, and P. Fua. *Free-shape polygonal object localization. In ECCV,* 2014), and medical imagery presented in D6 (A. H. Kadish, D. Bello, J. P. Finn, R. O. Bonow, A. Schaechter, H. Subacius, C. Albert, J. P. Daubert, C. G. Fonseca, and J J. Goldberger. *Rationale and Design for the Defibrillators to Reduce Risk by Magnetic Resonance Imaging Evaluation (DETERMINE) Trial. J Cardiovasc Electrophysiol,* 20(9):982-7, 2009) and D7 (S. Gerhard, J. Funke, J. Martel, A. Cardona, and R. Fetter. *Segmented anisotropic ssTEM dataset of neural tissue. figshare,* 2013). Finally, the online fine-tuning scheme is evaluated, demonstrating significant decrease in annotation time for novel datasets. It is assumed that user-provided ground-truth boxes around objects are given. Robustness of the model to noise is further analyzed with respect to those boxes, mimicking noisy annotators.

2.1. In-Domain Annotation

The above model is first evaluated in both training and evaluating using the same domain. This mimics the scenario where one takes an existing dataset, and uses it to annotate novel images from the same domain. The Cityscapes dataset is currently one of the most comprehensive benchmarks for instance segmentation. It contains 2975 training, 500 validation and 1525 test images with 8 semantic classes. To ensure a fair comparison, the same alternative split is followed as proposed by D1. Ground-truth polygons may contain occluded parts of an instance, which are removed from the pixel-wise labelling using depth ordering. Following D1 the polygons are preprocessed according to depth ordering to obtain polygons for only visible regions of each instance.

Evaluation Metrics:

Two quantitative measures are utilized to evaluate the model: 1) the intersection over union ('IoU') metric is used to evaluate the quality of the generated polygon and 2) the number of annotator clicks required to correct the predictions made by the model is counted. The correction protocol is described in detail below.

Baselines:

Following D1, performance is compared with DeepMask disclosed in D8 (P. O. Pinheiro, R. Collobert, and P. Dollar. *Learning to segment object candidates. In NIPS*, pages 1990-1998, 2015), SharpMask disclosed in D9 (P. O. Pinheiro, T-Y. Lin, R. Collobert, and P. Dollár. *Learning to refine object segments.* 2016), as well as Polygon-RNN disclosed in D1 as state-of-the-art baselines. The first two approaches are pixel-wise methods and errors in their output may not be easily corrected by an annotator. The automatic mode of the model disclosed herein is compared. In their original approach, D8 and D9 exhaustively sample patches at different scales over the entire image. Here, we evaluate D8 and D9 by providing exact ground-truth boxes to their models.

As in D1, two additional baselines are also used, namely SquareBox disclosed in D1, and Dilation10 disclosed in D10 (F. Yu and V. Koltun. *Multi-scale context aggregation by dilated convolutions. ICLR,* 2016). SquareBox considers the provided bounding box as its prediction. Dilation10 is obtained from the segmentation results of D10 from the model that was trained on the Cityscapes dataset.

Automatic Model:

The present model, Polygon-RNN++, is compared to the baselines in Table 1, and the results are presented as a series of submodels in which components are added to the base Polygon-RNN model, the addition of GGNN to the other components forming the full Polygon-RNN++. Here, Residual Polygon-RNN refers to the original Polygon-RNN model disclosed in D1 with the novel image architecture instead of VGG. The results of further aspects of the model added on are provided below the results for Residual Polygon-RNN. The full approach outperforms the top performer, Polygon-RNN as disclosed by D1, by almost 10% IoU, and achieves best performance for each class. Polygon-RNN++ also surpasses the reported human agreement in D1 of 78.6% IoU on cars, on average. Using human agreement on cars as a proxy, the model also obtains human-level performance for the truck and bus classes.

TABLE 1

| Model | Bicycle | Bus | Person | Train | Truck | Motorcycle | Car | Rider | Mean |
|---|---|---|---|---|---|---|---|---|---|
| Square Box | 35.41 | 53.44 | 26.36 | 39.34 | 54.75 | 39.47 | 46.04 | 26.09 | 40.11 |
| Dilation10 | 46.80 | 48.35 | 49.37 | 44.18 | 35.71 | 26.97 | 61.49 | 38.21 | 43.89 |
| DeepMask | 47.19 | 69.82 | 47.93 | 62.20 | 63.15 | 47.47 | 61.64 | 52.20 | 56.45 |
| SharpMask | 52.08 | 73.02 | 53.63 | 64.06 | 65.49 | 51.92 | 65.17 | 56.32 | 60.21 |
| Polygon-RNN | 52.13 | 69.53 | 63.94 | 53.74 | 68.03 | 52.07 | 71.17 | 60.58 | 61.40 |
| Residual Polygon-RNN | 54.86 | 69.56 | 67.05 | 50.20 | 66.80 | 55.37 | 70.05 | 63.40 | 62.16 |
| +Attention | 56.47 | 73.57 | 68.15 | 53.51 | 74.08 | 57.34 | 75.13 | 65.42 | 65.43 |
| +RL | 57.38 | 75.99 | 68.45 | 59.65 | 76.31 | 58.26 | 75.68 | 65.65 | 67.17 |
| +Evaluator Network | 62.34 | 79.63 | 70.80 | 62.82 | 77.92 | 61.69 | 78.01 | 68.46 | 70.21 |
| +GGNN | 63.06 | 81.38 | 72.41 | 64.28 | 78.90 | 62.01 | 79.08 | 69.95 | 71.38 |

Interactive Mode:

The interactive mode aims to minimize annotation time while obtaining high quality annotations. Following the simulation proposed in D1, the number of annotator clicks required to correct predictions from the model is calculated. The annotator corrects a prediction if it deviates from the corresponding GT vertex by a min distance of T, where the hyperparameter T governs the quality of the produced annotations. For fair comparison, distances are computed using manhattan distance at the model output resolution using distance thresholds $T \in [1, 2, 3, 4]$, as in D1.

Additionally, a second threshold $T_2$ is introduced, which is defined as the IoU between the predicted polygon and the GT mask, where polygons achieving agreement above $T_2$ are considered unnecessary for the annotator to interfere. This threshold is exploited due to the somewhat unsatisfactory correction simulation above: for example, if the predicted vertex falls along a GT polygon edge, this vertex is in fact correct and should not be corrected. Note that, in the extreme case of $T_2=1$, the simulator assumes that corrections are necessary for every predicted polygon. In this case, the simulation is equivalent to the one presented in D1.

Figure 6:
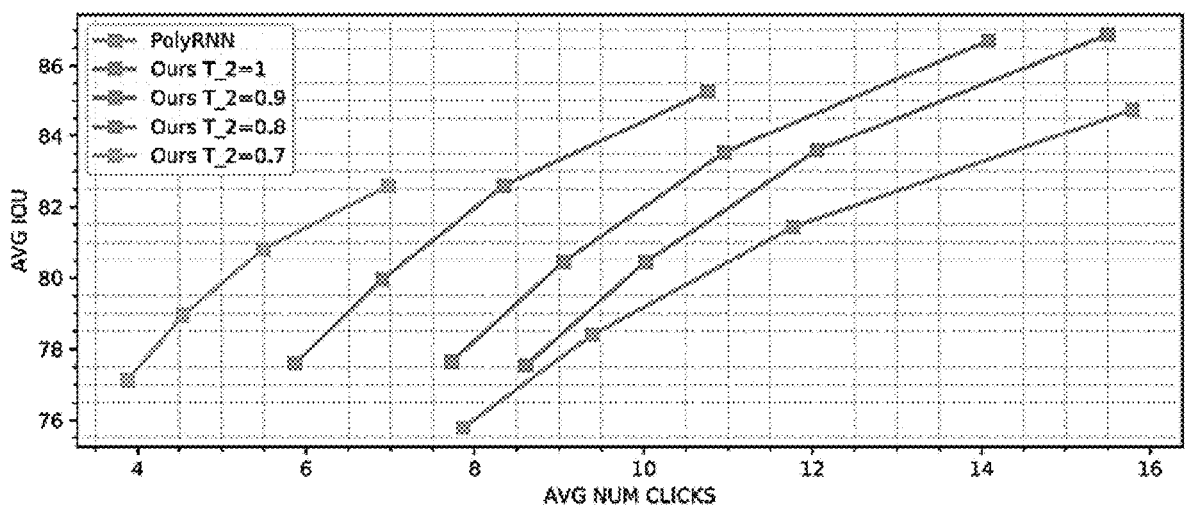
FIG. 6 shows a representation of experimental results of an embodiment.
Figure 7:
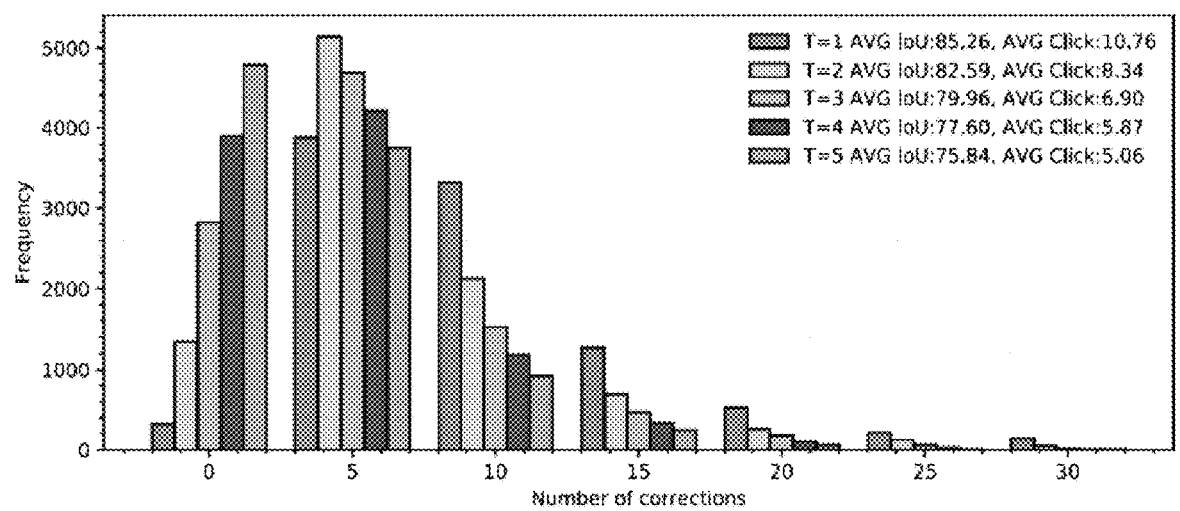
FIG. 7 shows a representation of experimental results of an embodiment.

In FIG. 6, the average number of clicks per instance required to annotate all classes on the Cityscapes val set (500 images) with different values of $T_2$ is compared to Polygon-RNN of D1 at $T_2=1$. Using $T_2=1$, the present model outperforms the model of D1, requiring fewer clicks to obtain the same IoU. At $T_2=0.8$ the present model is still more accurate than Polygon-RNN, as disclosed in D1, at $T_2=1.0$. At $T_2=0.7$, over 80% mIoU is achieved with only 5 clicks per object on average, which is a reduction of more than 50% over D1. As indicated in Table 3, a hired human annotator takes about 96 clicks to achieve 78.6 mIoU while our model gets 88.3 mIoU with only 3.75 clicks. FIG. 7 shows frequency of required corrections for different T at $T_2=0.8$.

TABLE 3

|  | GT | Human (crops) | PolyRNN* | Ours* | Ours |
|---|---|---|---|---|---|
| # Clicks | 33.56 | 96.09 | 5.41 | 3.75 | 0 |
| IoU (%) | 100 | 78.6 | 85.73 | 88.31 | 80.19 |
| Speed-Up | 1x | — | 6.20x | 8.95x | ∞ |

Robustness to Bounding Box Noise:

To simulate the effect of a lazy annotator, the effect of noise in the bbox provided to the model is analyzed. The bbox is randomly expanded by a percentage of its width and height. Results in Table 5 illustrates that the present model is very robust to some amount of noise (0-5%). Even in the presence of moderate and extreme noise (5-10%, 10-15%), it outperforms the reported performance of previous baselines which use perfect bboxes.

TABLE 5

| Bbox Noise (%) | IoU (%) |
|---|---|
| 0 | 71.38 |
| 0-5 | 70.54 |
| 5-10 | 68.07 |
| 10-15 | 64.80 |

2.2. Cross-Domain Evaluation

In this section, the performance of the present model is evaluated on different datasets that capture both shifts in environment (KITTI, as disclosed in D3) and domain (general scenes, aerial, medical). The model used was trained on Cityscapes without any fine-tuning on these datasets.

Figure 8:
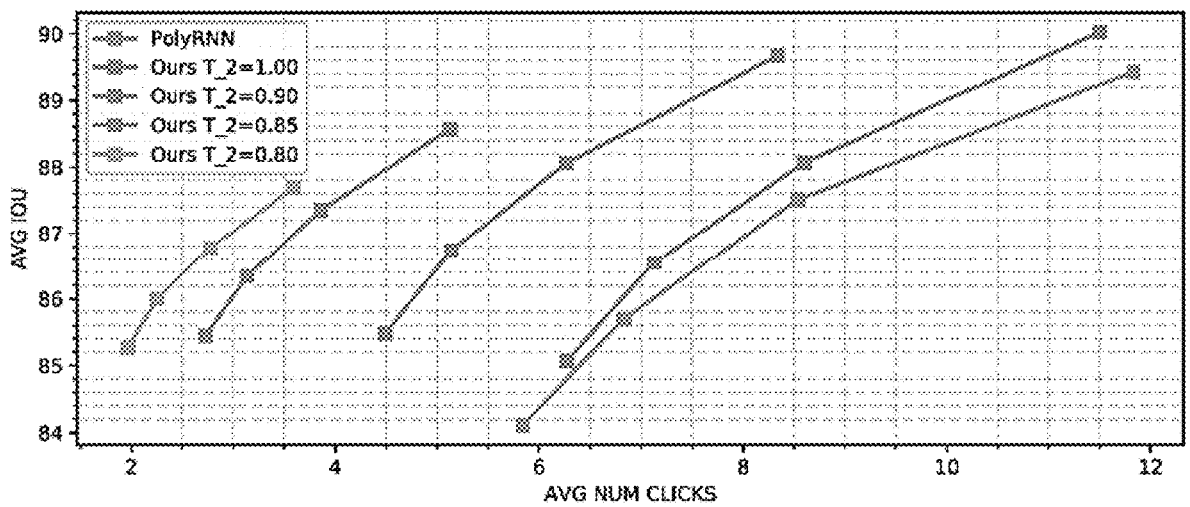
FIG. 8 shows a representation of experimental results of an embodiment.
Figure 9A:
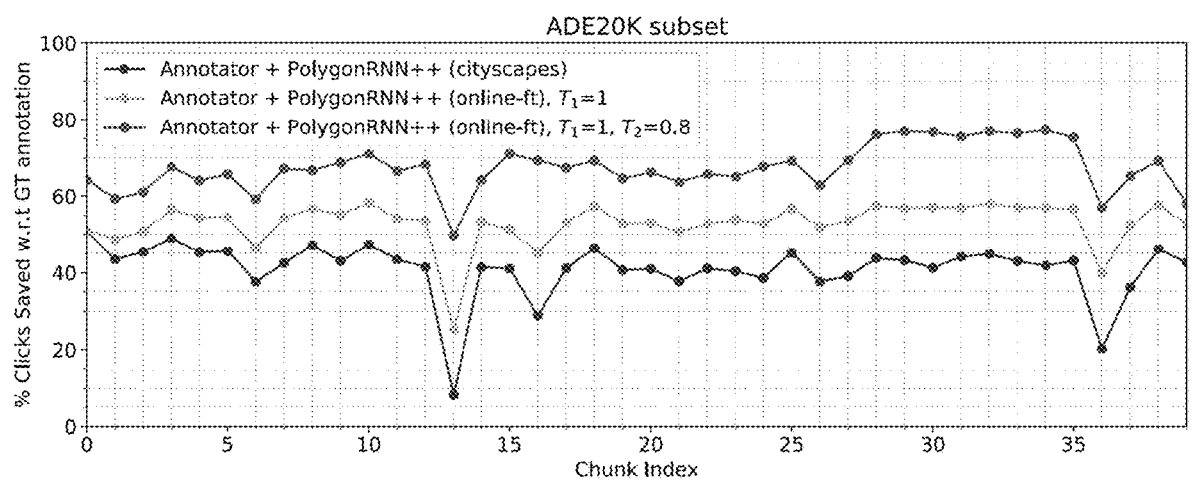
FIGS. 9A to 9D show representations of experimental results of an embodiment.
Figure 9B:
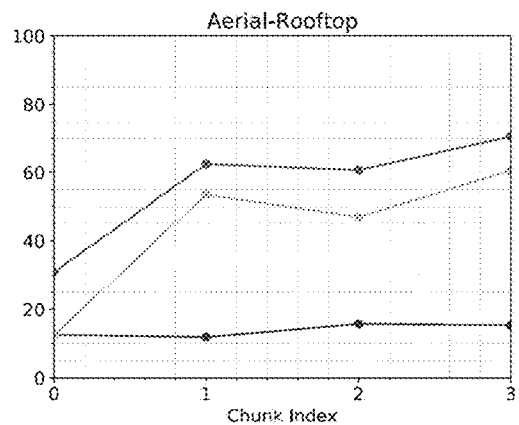
Figure 9C:
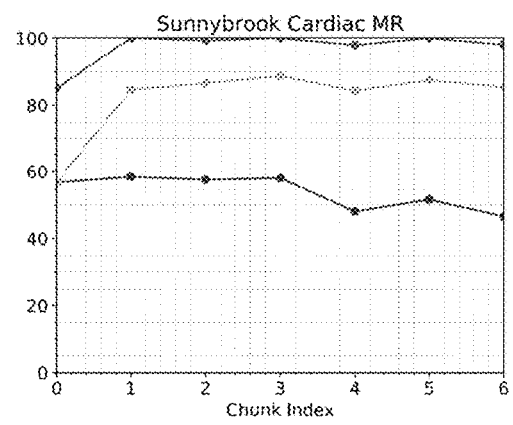
Figure 9D:
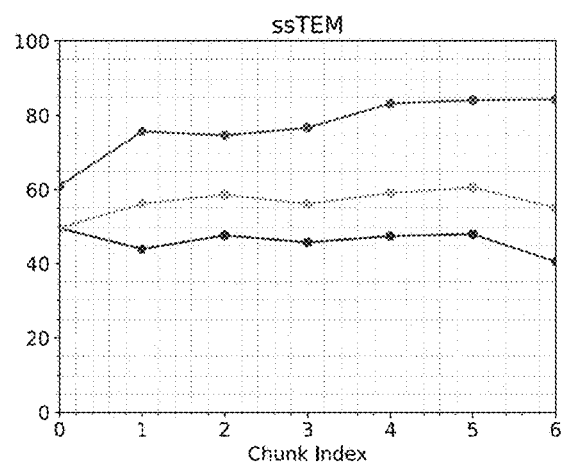

KITTI:

Polygon-RNN++ is used to annotate 741 instances of KITTI. The results in automatic mode are reported in TABLE 4 and the performance with a human in the loop is illustrated in FIG. 8. The present method outperforms all baselines showcasing its robustness to change in environment while being in a similar domain. With an annotator in the loop, the present model requires on average 5 fewer clicks than D1 to achieve the same IoU. It achieves human level agreement of 85% as reported by D11 (L.-C. Chen, S. Fidler, A. Yuille, and R. Urtasun. *Beat the mturkers: Automatic image labeling from weak 3d supervision. In CVPR,* 2014) with only 2 clicks on average by the annotator.

TABLE 4

| Model | # of Clicks | IoU (%) |
|---|---|---|
| DeepMask | — | 78.3 |
| SharpMask | — | 78.8 |
| Beat The MTurkers | 0 | 73.9 |
| Polygon-RNN | 0 | 74.22 |
| Ours w/o GGNN | 0 | 81.40 |
| Ours w/ GGNN | 0 | 83.14 |

2.2.1 Out-of-Domain Imagery

Datasets exhibiting varying levels of domain shift from Cityscapes are considered to evaluate the generalization capabilities of the present model.

Ade20K:

The ADE20K disclosed in D4 is a general scene parsing dataset containing 20,210 images in the training set, 2,000 images in the validation set, and 3,000 images in the testing set. The following subset of categories are selected from the validation set: television receiver, bus, car, oven, person and bicycle in our evaluation.

Aerial Imagery:

The Aerial Rooftop dataset disclosed in D5 consists of 65 aerial images of rural scenes containing several building rooftops, a majority of which exhibit fairly complex polygonal geometry. Performance for this dataset is reported for the test set.

Medical Imagery [14, 31, 10]:

Two medical segmentation datasets are used; one disclosed in D6 and D12 (A. Suinesiaputra, B. R. Cowan, A. O. Al-Agamy, M A. Elattar, N. Ayache, A. S. Fahmy, A. M Khalifa, P. Medrano-Gracia, M-P. Jolly, A. H. Kadish, D. C. Lee, J. Margeta, S. K. Warfield, and A. A. Young. *A collaborative resource to build consensus for automated left ventricular segmentation of cardiac MR images. Medical Image Analysis,* 18(1):50-62, 2014) and the other disclosed in D7 for our experiments. The former, used in the Left Ventricle Segmentation Challenge disclosed in D12, divides the data of 200 patients equally in the training and validation sets. The performance of the present model is reported on a subset of the validation set which only includes the outer contours that segment the epicardium. The latter provides two image stacks (training and testing) each containing 20 sections from serial section Transmission Electron Microscopy (ssTEM) images of the ventral nerve cord. The mitochondria and synapse segmentations are used from this data for the present model. Since ground-truth instances for the test stack are not publicly available, evaluation is done on the training set.

Quantitative Results:

For out-of-domain datasets, a baseline named Ellipse is introduced, which fits an ellipse into the GT bounding box. This was used in the present tests as many of the instances in D12 were ellipses. Results are shown with perfect and expanded bounding boxes (expansion similar to the present model) for Square Box and Ellipse. DeepMask and SharpMask were evaluated with perfect bounding boxes with the threshold suggested by the authors. Table 2, depicting some of the results, demonstrates high generalization capabilities of the present model.

TABLE 2

| Model | ADE | Rooftop | Cardiac MR | ssTEM |
|---|---|---|---|---|
| SquareBox (Expansion) | 42.95 | 40.71 | 62.10 | 42.24 |
| Ellipse (Expansion) | 48.53 | 47.51 | 73.63 | 51.04 |
| Square Box (Perfect) | 69.35 | 62.11 | 79.11 | 66.53 |
| Ellipse (Perfect) | 69.53 | 66.82 | 92.44 | 71.32 |
| DeepMask | 59.74 | 15.82 | 60.70 | 31.21 |
| SharpMask | 61.66 | 18.53 | 69.33 | 46.67 |
| Ours w/o GGNN | 70.21 | 65.03 | 80.55 | 53.77 |
| Ours w/ GGNN | 71.82 | 65.67 | 80.63 | 53.12 |

Online Fine-Tuning:

In these experiments, the simulated annotator has parameters $T=1$ and $T_2=0.8$. FIG. 9 reports the percentage of clicks saved with respect to GT polygons for the Cityscapes model and the online fine-tuned models. The adaptive approach overcomes stark domain shifts with as few as one chunk of data (40 images for Sunnybrook, 3 for ssTEM, 200 for ADE and 20 for Aerial) showcasing strong generalization. Overall, at least 65% overall reduction in the number of clicks across all datasets, with the numbers almost at 100% for the Sunnybrook Cardiac MR dataset. These results indicated that an annotation tool may be able to learn along with the annotator and significantly reduce human effort.

2.3. Qualitative Results

Figure 10:
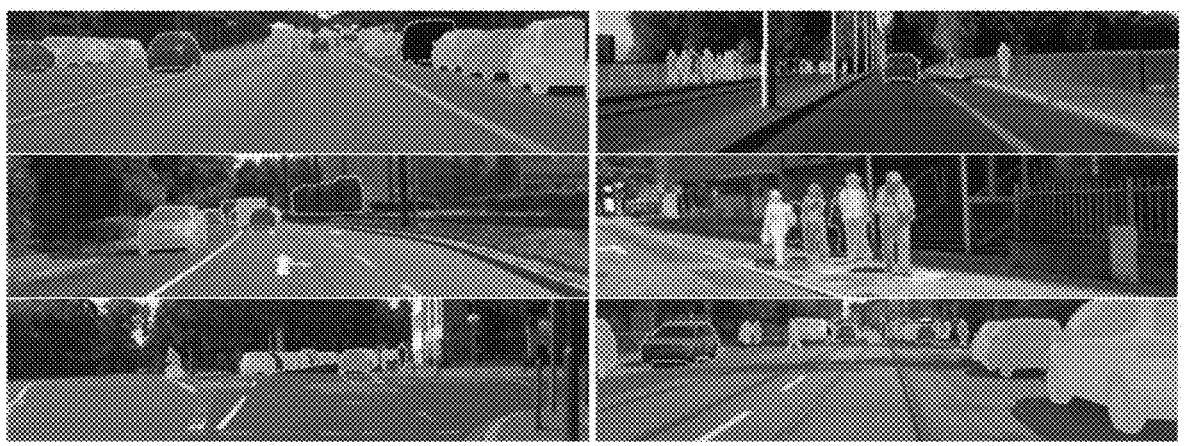
FIG. 10 shows examples of images annotated with an embodiment.
Figure 11:
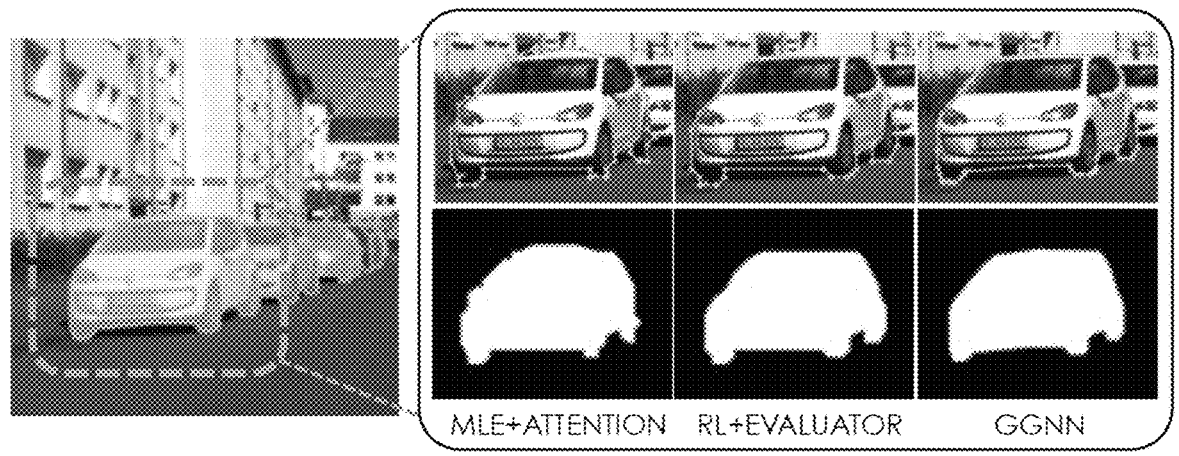
FIG. 11 shows examples of images annotated with embodiments.
Figure 12:
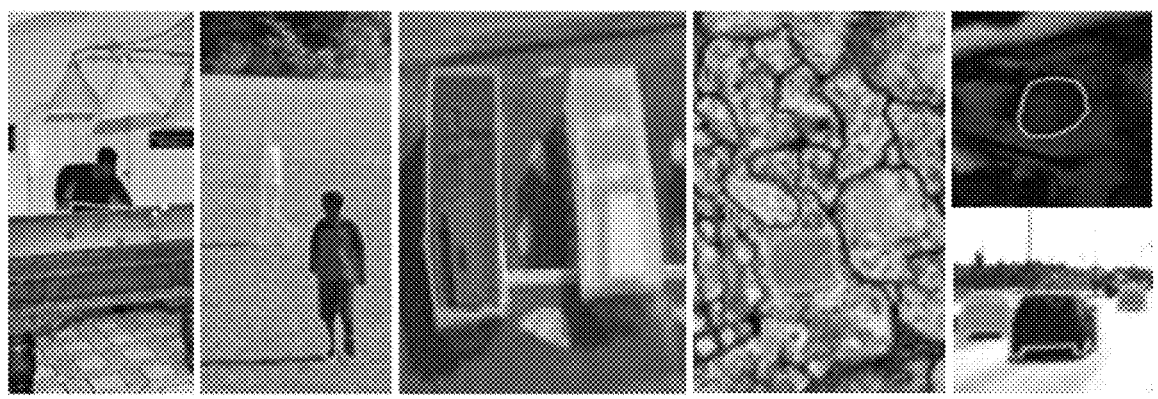
FIG. 12 shows examples of images annotated with an embodiment.

FIG. 10 shows example predictions obtained in automatic mode on Cityscapes. The improvements from specific parts of the model are illustrated in FIG. 11. As indicated, using RL and the evaluator may lead to crisper predictions, while the GGNN may upscale, add points and build a polygon resembling human annotation. FIG. 12 showcases automatic predictions from PolygonRNN++ on the out-of-domain datasets. The labeling results shown in FIG. 12 are obtained by exploiting GT bounding boxes, and no fine-tuning.

Figure 13:
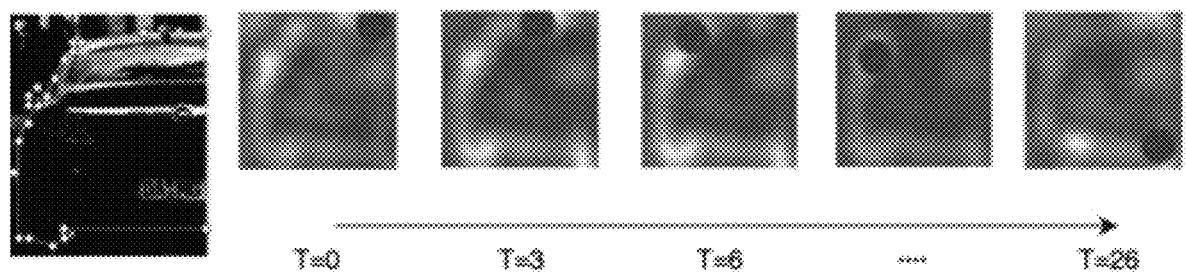
FIG. 13 shows examples of images annotated with an embodiment.

FIG. 13 illustrates a visualization of attention maps in the present model with T set to various levels.

3. Method Embodiment

Figure 14:
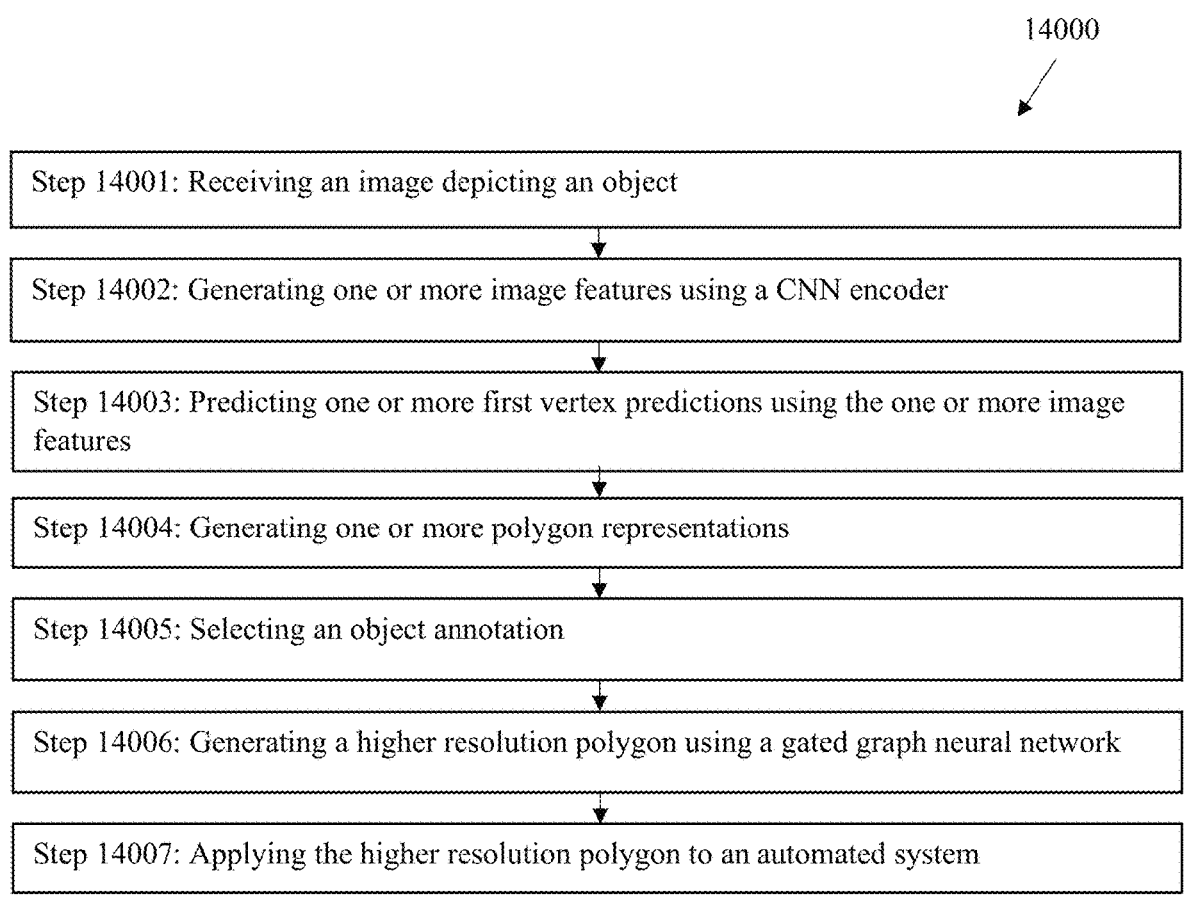
FIG. 14 shows a flow diagram of an embodiment.

An embodiment of a method 14000 is depicted in FIG. 14. Method 14000 is a method of annotating an object, by representing the object as a polygon outline. Method 14000 includes the step 14001 of receiving an image depicting an object. An object so received may then be processed by a CNN encoder to generate one or more image features at step 14002. One or more image features are then used to generate one or more first vertex predictions at step 14003, where the first vertex predictions are used by a subsequent neural network as a basis for generating a polygon representation of an image object.

One or more polygon representations are then generated at step 14004 by a recurrent decoder. The recurrent decoder may take the one or more first vertex predictions and use each first vertex prediction to create a polygon representation, which representations together may form a set of possible polygon representations. At step 14005 an evaluator network may select an object annotation selection from among the set of possible polygon representations.

The selected object annotation is then fed into a gated graph neural network provided to increase the resolution of the polygon representation at step 14006. The GGNN may produce a higher resolution polygon by adding a set of supplementary vertex predictions to the set of primary vertex predictions which defines the selected object annotation, defining a propagation model, and applying the model to adjust the position of the vertices of the set of supplementary vertex predictions and the vertices of the set of primary vertex predictions. The gated graph neural network may use input from the CNN encoder and the Recurrent decoder.

According to an embodiment, the number of vertices is decided by the model itself as it generates an end of sequence token when it thinks the polygon is completed.

The resulting higher resolution polygon object annotation may then be applied, such as to an automated system, such as a system for automated driving, map annotation, or medical image annotation.

4. System Embodiment

Figure 15:
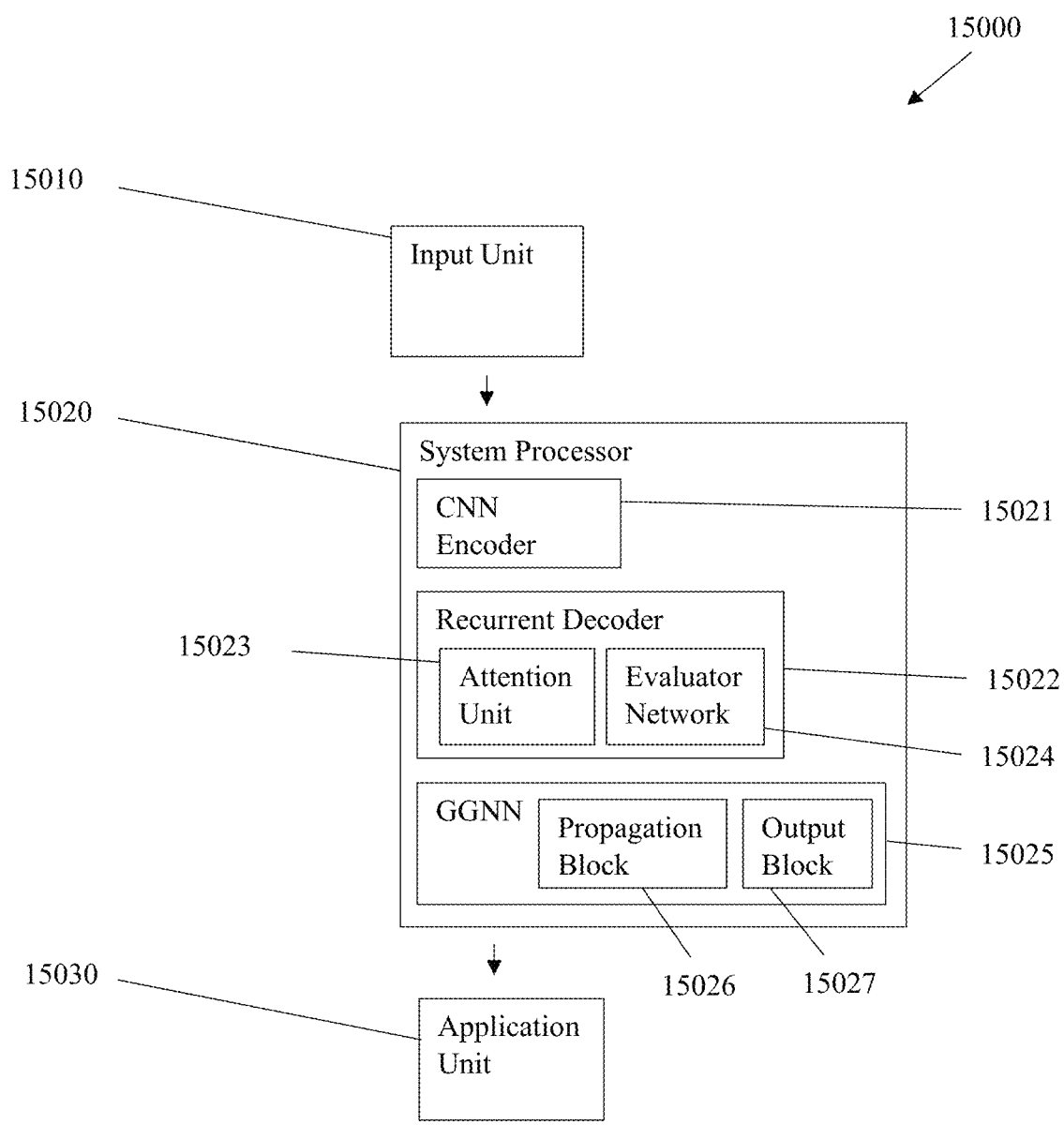
FIG. 15 shows a schematic diagram of an embodiment.

In some embodiments, as depicted in FIG. 15, a system 15000 is provided to annotate one or more objects, such as to locate an object in an image. System 15000 includes an input unit 15010 for receiving an image or other object carrying item for annotation. System 15000 includes a system processor 15020 for processing input. System 15000 also includes an output or application unit 15030, such as a computer monitor or other display or an output unit for sending annotated objects to a system such as an automated driving system, a medical imaging system, or a mapping system.

In some embodiments, object annotation is applied to guide an automated system. For example, object annotation is applied to guide the operation of an autonomous driving system or to guide automated aspects or features of a driving system.

As depicted in FIG. 15, system processor 15020 may include a CNN Encoder 15021, for generating image features from a received image. Image features may then be used to predict a first vertex of an object annotation, to be used by recurrent decoder 15022. Recurrent decoder 15022 may include an attention unit 15023 for visual attention, and an evaluator network 15024 to select a preferred polygon representation from polygon representations produced by recurrent decoder 15022.

System processor 15020 may also include a gated graph neural network 15025 for producing an upscaled polygon representation of an object. GGNN 15025 may include a propagation block 15026 and an output block 15027. GGNN 15025 may receive output from CNN encoder 15021, such as edge information, and may receive information from recurrent decoder 15022, such as vertex information defining a polygon, such as a preferred polygon selected by evaluator network 15024.

While various elements, blocks, or units are depicted or described as being either independent or as being components of other elements, blocks, or units, in other embodiments other arrangements of elements, blocks or units may be employed.

5. Further Method Embodiment

Figure 16:
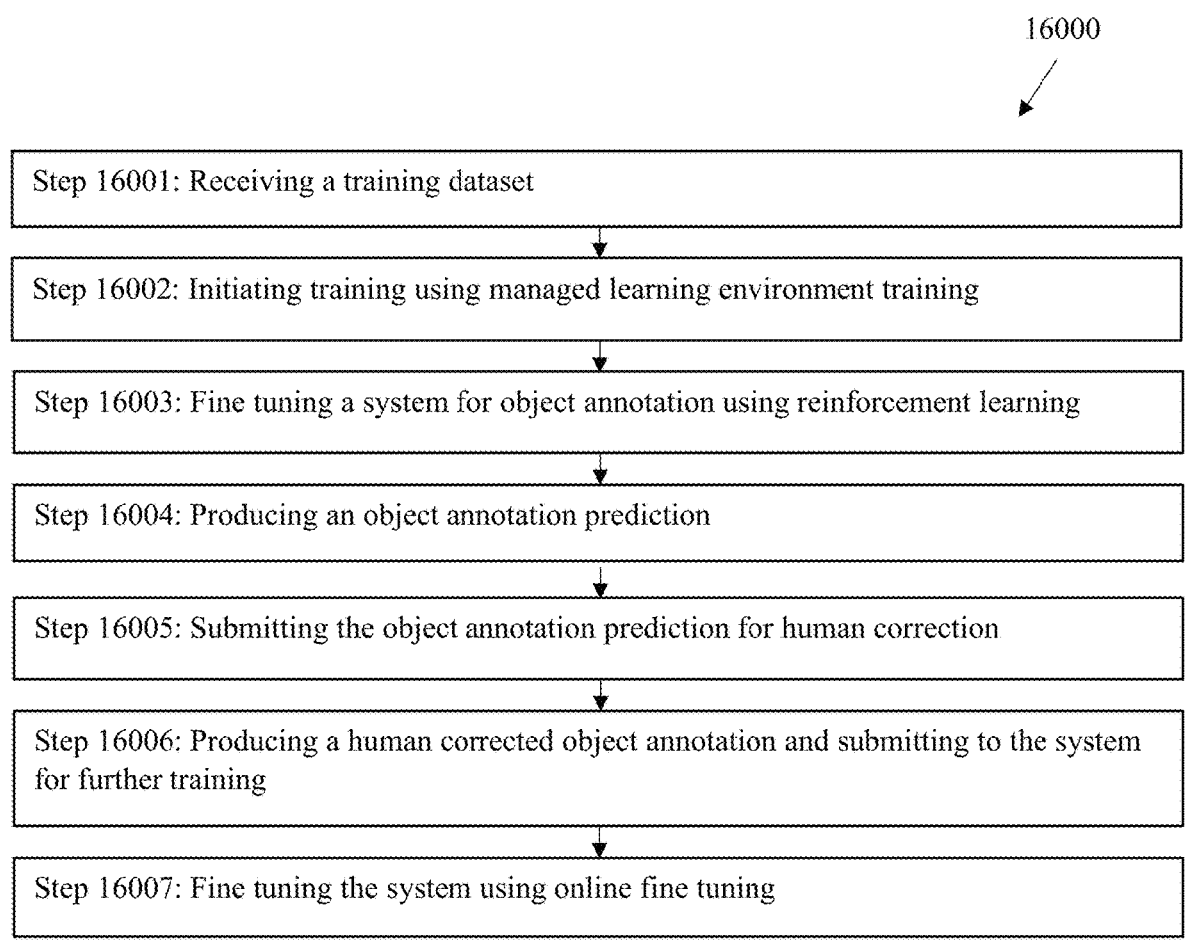
FIG. 16 shows a flow diagram of an embodiment.

As depicted in FIG. 16, another embodiment of the present invention may be a method 16000 of training a system of object annotation. Method 16000 includes receiving a training dataset at step 16001, initiating a training sequence for setting one or more weight matrices of the object annotation system using managed learning environment training at step 16002, and fine-tuning the one or more weight matrices of the object annotation system using reinforcement learning to produce a trained object annotation system at step 16003.

Method 16000 may also include producing an object annotation prediction for an image of the training dataset at step 16004, submitting the object annotation prediction for human correction at step 16005, and producing a human correction of the object annotation prediction and feeding the human correction back into the object annotation system to further train the object annotation system at step 16006.

Method 16000 may also include including fine-tuning the object annotation system using online fine-tuning at step 16007. Online fine-tuning involves training the prediction system while a user interacts with the annotation tool or platform. As a user interacts and creates new labelled data, the model can be trained on it to produce better annotations in subsequent usage, leading to lesser human interaction in the future.

It is to be understood that while method steps have been described in a particular order and depicted as following one another sequentially, one or more method steps may be performed simultaneously, and in some embodiments method steps may be performed in orders other than described and depicted.

All neural networks, such as neural networks of system 15000, including a CNN of CNN encoder 15021 and an RNN of recurrent decoder 15022, may be implemented by one or more computers executing computer readable instructions found on computer readable medium.

Alternative Embodiment

As described above, vertices are predicted sequentially, however, additional speed may be gained via an implementation that predicts all vertices simultaneously.

In the alternative embodiment, object annotation is framed as a regression problem, where the locations of all vertices are predicted simultaneously. The object may be represented as a graph with a fixed topology, and perform prediction using a Graph Neural Network (GNN) such as a Graph Convolutional Network (GCN). The model may be used and optimized for interactive annotation. The framework may further allow for parametrization of objects with either polygons or splines, adding additional flexibility and efficiency to the interactive annotation process. This embodiment is referred to herein as Curve-GCN, and is end-to-end differentiable, and runs in real time.

Object Annotation Via Curve-GCN

The framework for Curve-GCN annotates object instances with either polygons or (closed) splines. In order to approximate a curved contour, one would need to draw a polygon with a significant number of vertices, while this could be efficiently handled with a few control points using splines. The framework is designed to enable both a polygon and a spline representation of an object contour.

The typical labeling scenario is followed where it is assumed that the annotator has selected the object of interest by placing a bounding box around it (see Acuna and Castreion). The image is cropped around this box and frame object annotation inside this crop as a regression problem; to predict the locations of all control points (vertices) simultaneously, from an initialization with a fixed topology. The model is described from representation to inference first, then a discussion of training and finally an analysis of using the model for human-in-the loop annotation, by formulating both inference as well as training in the interactive regime.

Polygon/Spline-GCN

Assume the target object shapes can be well represented using N control points, which are connected to form a cycle. The induced shape is rendered by either connecting them with straight lines (thus forming a polygon), or higher order curves (forming a spline). Treat the location of each control point as a continuous random variable, and learn to predict these via a Graph Neural Network that takes image evidence as input. In Acuna, the authors exploited Gated Graph Neural Networks (GGNN) [Y. Li, D. Tarlow, M. Brockschmidt, and R. Zemel. Gated graph sequence neural networks, *ICLR*, 2016.] as a polygon refinement step, in order to upscale the vertices output by the RNN to a higher resolution. In similar vein, Pixel2Mesh [N. Wang, Y. Zhang, Z. Li, Y. Fu, W. Liu, and Y.-G. Jiang. Pixel2mesh: Generating 3d mesh models from single rgb images, *ECCV*, 2018] exploited a Graph Convolutional Network (GCN) to predict vertex locations of a 3D mesh. The key difference between a GGNN and a GCN is in the graph information propagation; a GGNN shares propagation matrices through time akin to a gated recurrent unit (GRU), whereas a GCN has propagation steps implemented as unshared "layers", similar to a typical CNN architecture. The GCN is adopted in the present model due to its higher capacity. Hence, the reference name of the present model, Curve-GCN, which includes Polygon or Spline-GCN.

Figure 17:
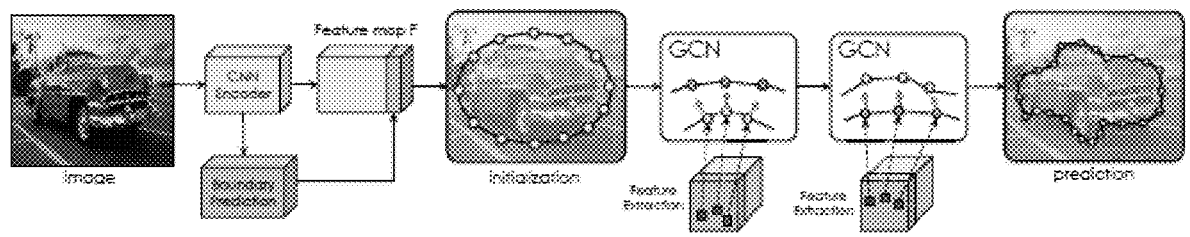
FIG. 17 shows a schematic diagram of aspects of an embodiment.

Notation:

Initialize the nodes of the GCN to be at a static initial central position in the given image crop (FIG. 17). The GCN predicts a location offset for each node, aiming to move the node correctly onto the object's boundary. Let $cp_i=[x_i, y_i]^T$ denote the location of the i-th control point and $V=\{cp_0, cp_1, \ldots, cp_{N-1}\}$ be the set of all control points. Define the graph to be $G=(V, E)$, with V defining the nodes and E the edges in the graph. Form E by connecting each vertex in V with its four neighboring vertices. This graph structure defines how the information propagates in the GCN. Connecting 4-way allows faster exchange of information between the nodes in the graph.

Extracting Features:

Given a bounding box, crop the corresponding area of the image and encode it using a CNN, the specific choice of which is determined by the user. Denote the feature map obtained from the last convolutional layer of the CNN encoder applied on the image crop as Fe. In order to help the model see image boundaries, supervise two additional branches, i.e. an edge branch and a vertex branch, on top of the CNN encoder's feature map $F_c$, both of which consist of one 3×3 convolutional layer and one fully-connected layer. These branches are trained to predict the probability of existence of an object edge/vertex on a 28×28 grid. Train these two branches with the binary cross entropy loss. The predicted edge and vertices outputs are concatenated with Fc, to create an augmented feature map F. The input feature for a node $cp_i$ in the GCN is a concatenation of the node's current coordinates $(x_i, y_i)$, where top-left of the cropped images is (0, 0) and image length is 1, and features extracted from the corresponding location in F: $f_i^0 = \text{concat}\{F(x_i, y_i), x_i, y_i\}$. Here, $F(x_i, y_i)$ is computed using bilinear interpolation.

GCN Model:

A multi-layer GCN is used. The graph propagation step for a node $cp_i$ at layer l is expressed as:

$$f_i^{l+1} = w_0^l f_i^l + \sum_{cp_j \in N(cp_i)} w_1^l f_j^l$$

where $N(cp_i)$ denotes the nodes that are connected to $cp_i$ in the graph, and $w_0^l, w_1^l$ are the weight matrices. Following the method of Bronstein [M. M. Bronstein, J. Bruna, Y. LeCun, A. Szlam, and P. Van-dergheynst. Geometric deep learning: going beyond euclidean data, *CVPR*, 2017], utilize a Graph-ResNet to propagate information between the nodes in the graph as a residual function. The propagation step in one full iteration at layer l then takes the following form:

$$r_i^l = ReLU\left(w_0^l f_i^l + \sum_{cp_j \in N(cp_i)} w_1^l f_j^l\right)$$

$$r_i^{l+1} = \tilde{w}_0^l r_i^l + \sum_{cp_j \in N(cp_i)} \tilde{w}_0^l r_j^l$$

$$f_i^{l+1} = ReLU(r_i^{l+1} + f_i^l),$$

where $\tilde{w}_0, \tilde{w}_1$ are weight matrices for the residual. On top of the last GCN layer, apply a single fully connected layer to take the output feature and predict a relative location shift, $(\Delta x_i, \Delta y_i)$, for each node, placing it into location $[x'_i, y'_i]=[x_i+\Delta x_i, y_i+\Delta y_i]$. Also perform iterative inference similar to the coarse-to-fine prediction in [35]. To be more specific, the new node locations $[x_i, y_i]$ are used to re-extract features for the nodes, and another GCN predicts a new set of offsets using these features. This mimics the process of the initial polygon/spline iteratively "walking" towards the object's boundaries.

Spline Parametrization:

The choice of spline is important, particularly for the annotator's experience. The two most common splines, i.e. the cubic Bezier spline and the uniform B-Spline [e.g. H. Prautzsch, W. Boehm, and M. Paluszny. *Bézier and B-spline techniques*. Springer Science & Business Media, 2013], are defined by control points which do not lie on the actual curve, which could potentially confuse an annotator that needs to make edits. Following Tan [J. H. Tan and U. R. Acharya. Active spline model: a shape based model interactive segmentation. *Digital Signal Pro-cessing*, 35:64-74, 2014], use the centripetal Catmull-Rom spline (CRS) [e.g. C. Yuksel, S. Schaefer, and J. Keyser. Parameterization and applications of catmull-rom curves. *Computer-Aided Design*, 43(7):747-755, 2011.], which has control points along the curve. Yuksel et al., which is incorporated herein by reference, provides for a detailed visualization of different types of splines.

For a curve segment $S_i$ defined by control points $cp_{i-1}$, $cp_i$, $cp_{i+1}$, $cp_{i+2}$ and a knot sequence $t_{i-1}$, $t_i$, $t_{i+1}$, $t_{i+2}$, the CRS is interpolated by:

$$S_i = \frac{t_{i+1}-t}{t_{i+1}-t_i}L_{012} + \frac{t-t_i}{t_{i+1}-t_i}L_{123} \text{ where}$$

$$L_{012} = \frac{t_{i+1}-t}{t_{i+1}-t_{i-1}}L_{01} + \frac{t-t_{i-1}}{t_{i+1}-t_{i-1}}L_{12}$$

$$L_{123} = \frac{t_{i+2}-t}{t_{i+2}-t_i}L_{12} + \frac{t-t_i}{t_{i+2}-t_i}L_{23}$$

$$L_{01} = \frac{t_i-t}{t_i-t_{i-1}}cp_{i-1} + \frac{t-t_{i-1}}{t_i-t_{i-1}}cp_i$$

$$L_{12} = \frac{t_{i+1}-t}{t_{i+1}-t_i}cp_i + \frac{t-t_i}{t_{i+1}-t_i}cp_{i+1}$$

$$L_{23} = \frac{t_{i+2}-t}{t_{i+2}-t_{i+1}}cp_{i+1} + \frac{t-t_{i+1}}{t_{i+2}-t_{i+1}}cp_{i+2},$$

and $t_{i+1} = \|cp_{i+1}-cp_i\|_2^{\alpha} + t_i$, $t_0=0$. Here, α ranges from 0 to 1. A choice is made of α=0.5 following Tan, which in theory produces splines without cusps or self-intersections [see Yuskel et al., infra]. To make the spline a closed and $C^1$-continuous curve, add three additional control points:

$$cp_N = cp_0$$

$$cp_{N+1} = cp_0 + \frac{\|cp_{N-1}-cp_0\|_2}{\|cp_1-cp_0\|_2}(cp_1-cp_0)$$

$$cp_{-1} = cp_0 + \frac{\|cp_1-cp_0\|_2}{\|cp_{N-1}-cp_0\|_2}(cp_{N-1}-cp_0)$$

Training

The model is trained with two different loss functions. First, the model is trained with a Point Matching Loss, and then fine-tuned with a Differentiable Accuracy Loss. More specific details and ablations are provided in the experimental data.

Point Matching Loss

Typical point-set matching losses, such as the Chamfer Loss, assumed unordered sets of points (i.e. they are permutation invariant). A polygon/spline, however, has a well-defined ordering, which an ideal point set matching loss would obey. Assuming equal sized and similarly ordered (clockwise or counter-clockwise) prediction and ground truth point sets, denoted as $p=\{p_0, p_1, \ldots, p_{K-1}\}$, and $p'=\{p'_0, p'_1, \ldots, p'_{K-1}\}$ respectively (K is the number of points), define the matching loss as:

$$L_{match}(p, p') = \min_{j \in [0,\ldots,K-1]} \sum_{i=0}^{K-1} \|p_i - p'_{(j+i)\%K}\|_1$$

Notice that this loss explicitly ensures an order in the vertices in the loss computation. Training with an unordered point set loss function, while maintaining the topology of the polygon could result in catastrophic self-intersections, while the ordered loss function avoids it.

Sampling equal sized point sets. Since annotations may vary in the number of vertices, while the model always assumes N, additional points are sampled along boundaries of both ground-truth polygons and our predictions. For Polygon-GCN, K points are uniformly sampled along edges of the predicted polygons, and for Spline-GCN, K points are sampled along the spline by uniformly ranging t from $t_i$ to $t_{i+1}$. The same number of points are uniformly sampled along the edges of the ground-truth polygon. K=1280 in used in the experiments as detailed below. Sampling more points would have a higher computational cost, while sampling fewer points would make curve approximation less accurate. Note that the sampling only involves interpolating the control points, ensuring differentiability.

Differentiable Accuracy Loss

To perfectly align the predicted polygon and the ground-truth silhouette, a differentiable rendering loss is employed, which encourages masks rendered from the predicted control points to agree with ground-truth masks. This has been used previously to optimize 3D mesh vertices to render correctly onto a 2D image [e.g. H. Kato, Y. Ushiku, and T. Harada. Neural 3d mesh renderer, *ECCV*, 2018, and M. M. Loper and M. J. Black. Opendr: An approximate differentiable renderer, *ECCV*, pages 154-169, 2014, D. Fleet, T. Pajdla, B. Schiele, and T. Tuytelaars, editors].

The rendering process can be described as a function R; $M(\theta)=R(p(\theta))$, where p is the sampled point sequence on the curve, and M is the corresponding mask rendered from p. The predicted and the ground-truth masks can be compared by computing their difference with the L1 loss:

$$L_{render}(\theta) = \|M(\theta) - M_{gt}\|_1$$

Note that $L_{render}$ is exactly the pixel-wise accuracy of the predicted mask M (θ) with respect to the ground truth $M_{gt}$. The method for obtaining M in the forward pass and back-propagating the gradients through the rendering process R, from $$\frac{\partial L}{\partial M} \text{ to } \frac{\partial L}{\partial p}$$

in the backward pass are detailed next.

Figure 18:
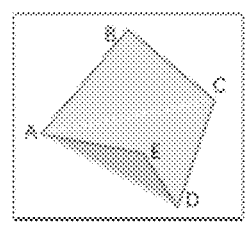
FIG. 18 shows a representation of an aspect of an embodiment.
Figure 19:
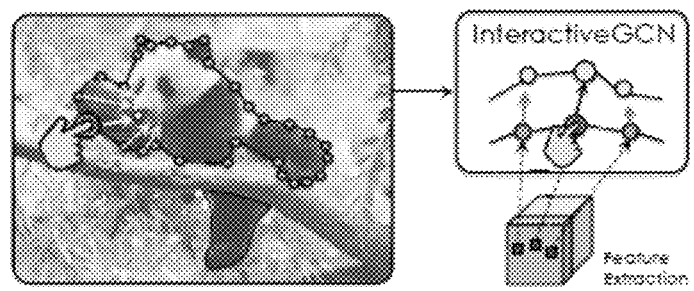
FIG. 19 shows a schematic diagram of aspects of an embodiment.

Forward Pass:

Render p into a mask using OpenGL. As shown in FIG. 18 the shape is decomposed into triangle fans $f_j$ and assign positive or negative values to their area based on their orientation. Render each face with the assigned value, and sum over the rendering of all the triangles to get the final mask. Note that this works for both convex and concave polygons [e.g. D. Shreiner and T. K. O. A. W. Group.

*OpenGL Programming Guide: The Official Guide to Learning OpenGL*, Versions 3.0 and 3.1. Addison-Wesley Professional, 7th edition, 2009].

Backward Pass:

The rendering process is non-differentiable in OpenGL due to rasterization, which truncates all float values to integers. However, following Loper et al., infra, compute its gradient with first order Taylor expansion. Then reutilize the triangle fans from the decomposition in the forward pass (see FIG. 18) and analyze each triangle fan separately. Taking a small shift of the fan $f_j$, calculate the gradient with respect to the j-th triangle as:

$$\frac{\partial M_j}{\partial f_j} = \frac{R(f_j + \Delta t) - R(f_j)}{\Delta t},$$

where $M_j$ is the mask corresponding to the fan $f_j$. Here, $\Delta t$ can be either in the x or y direction. For simplicity, let $\Delta t$ to be a 1 pixel shift, which alleviates the need to render twice, and allows calculating gradients by subtracting neighboring pixels. Next, pass gradient:

$$\frac{\partial M_j}{\partial f_j}$$

to its three vertices $f_{j,0}$, $f_{j,1}$ and $f_{1,2}$:

$$\frac{\partial M_j}{\partial f_{j,k}} = \sum_i w_k^i \frac{\partial M_j^i}{\partial f_j} \quad k \in [0, 1, 2]$$

which is summed over all pixels i. For the i-th pixel $M_j^i$ in the rendered image $M_j$, compute its weight $w_0^i$, $w_1^i$ and $w_2^i$ with respect to the vertices of the face $f_j$ as its barycentric coordinates. For more details, refer to Loper et al.

Annotator in the Loop

A potential drawback of Polygon-RNN is that once the annotator corrects one point, all of the subsequent points will be affected due to the model's recurrent structure. This is often undesirable, as the changes can be drastic. Alternatively, it is desired to have flexibility to change any point, and further constrain that only the neighboring points can change. As in Polygon-RNN, the correction is assumed to be in the form of drag-and-drop of a point.

To make the model interactive, another GCN is trained that consumes the annotator's correction and predicts the relative shifts of the other control points. This GCN is referred to herein as the InteractiveGCN. The network's architecture the same as the original GCN, except that two additional dimensions are now appended to the corrected node's (say node i) input feature, representing the annotator's correction:

$$f_i^0 = \text{concat}\{F(x_i, y_i), x_i, y_i, \Delta x_i, \Delta y_i\},$$

where $(\Delta x_i, \Delta y_i)$ is the shift given by the annotator. For all other nodes, set $(\Delta x_i, \Delta y_i)$ to zero. Do not perform iterative inference here. The InteractiveGCN allows a radius of influence by simply masking predictions of nodes outside the radius to 0. In particular, let k neighbors on either side of node i to be predicted, i.e., $cp_{(i-k) \% N}, \ldots, cp_{(i-1) \% N}$, $cp_{(i+1) \% N}, \ldots, cp_{(i+k) \% N}$. Set k=2 is set in the experiments described herein, while noting that in principle, the annotator could vary k at test time.

InteractiveGCN is trained by mimicking an annotator that iteratively moves wrong control points onto their correct locations. This assumes that the annotator always chooses to correct the worst predicted point. This is computed by first aligning the predicted polygon with GT, by finding the mini-mum of our point matching loss (Sec. 3.2.1). Then find the point with the largest maximum manhattan distance to the corresponding GT point. The network is trained to move the neighboring points to their corresponding ground-truth positions. Then iterate between the annotator choosing the worst prediction, and training to correct its neighbors. In every iteration, the GCN first predicts the correction for the neighbors based on the last annotator's correction, and then the annotator corrects the next worst point. Then let the gradient back-propagate through the iterative procedure, helping the InteractiveGCN to learn to incorporate possibly many user interactions. The training procedure is summarized in Algorithm 1, where c denotes the number of iterations.

| Algorithm 1 Learning to Incorporate Human-in-the-Loop |
|---|
| 1: while not converged do |
| 2:   (rawImage, gtCurve) = Sample(Dataset) |
| 3:   (predCurve, F) = Predict(rawImage) |
| 4:   data = [ ] |
| 5:   for i in range(c) do |
| 6:      corrPoint = Annotator(predictedCurve) |
| 7:      data += (predCurve, corrPoint, gtCurve, F) |
| 8:      predCurve = InteractiveGCN(predCurve, corrPoint) |
| 9:                                   ▷ Do not stop gradients |
| 10:  TrainInteractiveGCN(data) |

Experimental Results

Curve-GCN was tested for both in-domain and cross-domain instance annotation. The Cityscapes dataset from Cordts et a. [M. Cordts, M. Omran, S. Ramos, T. Rehfeld, M. Enzweiler, R. Benenson, U. Franke, S. Roth, and B. Schiele. The cityscapes dataset for semantic urban scene understanding, *CVPR*, 2016] was used as the main benchmark to train and test for the Curve-GCN model. Both automatic and interactive regimes and analyzed, and compared to state-of-the-art baselines for both. For cross-domain experiments, the Cityscapes-trained model is evaluated for generalization capability on the KITTI dataset from Geiger et al. [A. Geiger, P. Lenz, and R. Urtasun. Are we ready for Autonomous Driving? The KITTI Vision Benchmark Suite, *CVPR*, 2012] and four out-of-domain datasets, ADE20K from Zhou et al. [B. Zhou, H. Zhao, X. Puig, S. Fidler, A. Barriuso, and A. Torralba. Scene parsing through ade20k dataset, *CVPR*, 2017], Aerial Rooftop from Sun et al. [X. Sun, C. M. Christoudias, and P. Fua. Free-shape polygonal object localization. In *European Conference on Computer Vision*, pages 317-332. Springer, 2014], Cardiac MR from Suinesiaputra et al. [A. Suinesiaputra, B. R. Cowan, A. O. Al-Agamy, M. A. Elat-tar, N. Ayache, A. S. Fahmy, A. M. Khalifa, P. Medrano-Gracia, M.-P. Jolly, A. H. Kadish, et al. A collaborative resource to build consensus for automated left ventricular segmentation of cardiac mr images. *Medical image analysis*, 18(1):50-62, 2014], and ssTEM from Gerhard et al. [S. Gerhard, J. Funke, J. Martel, A. Cardona, and R. Fetter. Segmented anisotropic ssTEM dataset of neural tissue. 11 2013], following those used for Polygon-RNN++ as previously described. To indicate whether the model uses polygons or splines, they are named Polygon-GCN and Spline-GCN, respectively.

Image Encoder:

Following Polygon-RNN++ as previously described by, the ResNet-50 backbone architecture is used as the image encoder.

Training Details:

The model is first trained via the matching loss, followed by fine-tuning with the differentiable accuracy loss. The former is significantly faster, but has less flexibility, i.e. points are forced to exactly match the GT points along the boundary. Differentiable accuracy loss provides a remedy as it directly optimizes for accuracy. However, since it requires a considerably higher training time it is only employed in the fine-tuning stage. For speed issues the matching loss is used to train the InteractiveGCN. A learning rate of 3e-5 is used which is decayed every 7 epochs.

As a detail, note that the Cityscapes dataset contains a significant number of occluded objects, which causes many objects to be split into disconnected components. Since the matching loss operates on single polygons, the model is trained on single component instances first, then fine-tuned with the differentiable accuracy loss on all instances.

Baselines: Since Curve-GCN operates in two different regimes, it is compared with the relevant baselines in each. For the automatic mode, it is compared to Polygon-RNN++ [1], and PSP-DeepLab [7, 38]. The provided DeepLab-v2 model is from Maninis et al. [K.-K. Maninis, S. Caelles, J. Pont-Tuset, and L. Van Gool. Deep extreme cut: From extreme points to object segmentation. In *CVPR*, 2018.], which is pre-trained on ImageNet, and fine-tuned on PASCAL for semantic segmentation. Pyramid scene parsing [as in H. Zhao, J. Shi, X. Qi, X. Wang, and J. Jia. Pyramid scene parsing network. In *CVPR*, 2017.] is stacked to enhance performance. For the interactive mode, the benchmark is against Polygon-RNN++ and DEXTR [Maninijs et al.]. Both PSP-DeepLab and DEXTR are fine-tuned on the Cityscapes dataset. Cross-validation of their thresholds that decide between foreground/background on the validation set was also performed.

Evaluation Metrics:

As with Polygon-RNN the performance is evaluated by computing Intersection-over-Union (IoU) of the predicted and ground-truth masks. However, as noted above, IoU focuses on the full region and is less sensitive to the inaccuracies along the object boundaries. For the purpose of object annotation, boundaries are especially important—even slight deviations may not escape the eye of an annotator. Thus, the Boundary F score is also computed per Perazzi et al. [Perazzi, J. Pont-Tuset, B. McWilliams, L. V. Gool, M. Gross, and A. Sorkine-Hornung. A benchmark dataset and evaluation methodology for video object segmentation. In *The IEEE Conference on Computer Vision and Pattern Recognition (CVPR)*, 2016], which calculates precision/recall between the predicted and the ground-truth boundary, by allowing some misalignment slack. Given that Cityscapes is finely annotated, results are reported at stringent thresholds (slack) of 1 and 2 pixels.

In-Domain Annotation

The model is first valuated when both training and inference are performed on Cityscapes. This dataset contains 2975/500/1525 images for training, validation and test, respectively. For a fair comparison, the same split and data preprocessing procedure is followed as in Polygon-RNN++ above.

Automatic Mode:

Table 6 reports results of the Polygon and Spline-GCN and compares them with baselines. The performance metric used is IoU. Note that PSP-DeepLab uses a more powerful image encoder, which is pretrained on PASCAL for segmentation. The Spline-GCN outperforms Polygon-RNN++ and is on par with PSP-DeepLab. It also performs over Polygon-GCN, likely because most Cityscapes objects are curved. The results also show the significance of the differentiable accuracy loss (diffAcc) which leads to large improvements over the model trained with the matching loss alone (denoted with MLoss in Table). The model mostly loses against PSP-DeepLab on the train category, which is believed due to the fact that trains in Cityscapes are often occluded and broken into multiple components. Since the GCN approach predicts only a single connected component, it may struggle on such cases.

TABLE 6

| Model | Bicycle | Bus | Person | Train | Truck | Motorcycle | Car | Rider | Mean |
|---|---|---|---|---|---|---|---|---|---|
| Polygon-RNN++ | 57.38 | 75.99 | 68.45 | 59.65 | 76.31 | 58.26 | 75.68 | 65.65 | 67.17 |
| Polygon-RNN++ (with BS) | 63.06 | 81.38 | 72.41 | 64.28 | 78.90 | 62.01 | 79.08 | 69.95 | 71.38 |
| PSP-DeepLab | 67.18 | 83.81 | 72.62 | 68.76 | 80.48 | 65.94 | 80.45 | 70.00 | 73.66 |
| Polygon-GCN (MLoss) | 63.68 | 81.42 | 72.25 | 61.45 | 79.88 | 60.86 | 79.84 | 70.17 | 71.19 |
| +DiffAcc | 66.55 | 85.01 | 72.94 | 60.99 | 79.78 | 63.87 | 81.09 | 71.00 | 72.66 |
| Spline-GCN (MLoss) | 64.75 | 81.71 | 72.53 | 65.87 | 79.14 | 62.00 | 80.16 | 70.57 | 72.09 |
| +DiffAcc | 67.36 | 85.43 | 73.72 | 64.40 | 80.22 | 64.86 | 81.88 | 71.73 | 73.70 |

Figure 20:
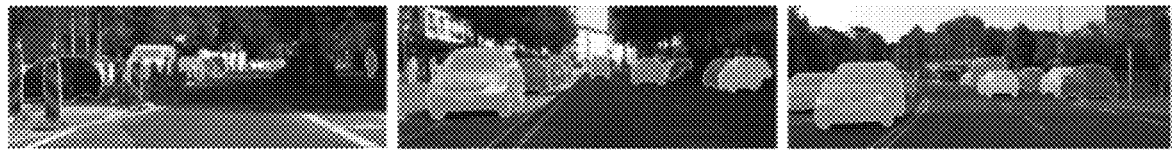
FIG. 20 shows examples of images annotated with an embodiment.
Figure 21:
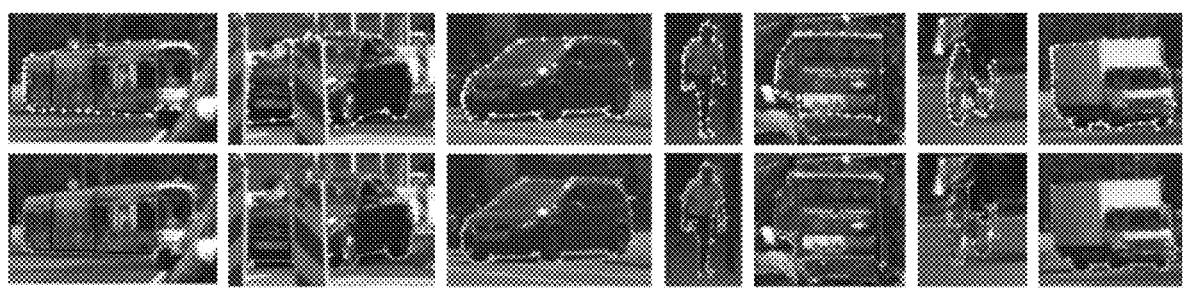
FIG. 21 shows examples of images annotated with an embodiment.
Figure 22:
FIG. 22 shows examples of images annotated with an embodiment.

Table 2 compares models with respect to F boundary metrics. It may be observed that while Spline-GCN is on par with PSP-DeepLab under the IoU metric, it is significantly better in the more precise F score. This means that the model more accurately aligns with the object boundaries than PSP-DeepLab. Qualitative results are shown in FIGS. 20, 21, and 22.

TABLE 7

| Model | mIOU | F at 1px | F at 2px |
|---|---|---|---|
| Polyma++ (BS) | 71.38 | 46.57 | 62.26 |
| PSP-DeepLab | 73.66 | 47.10 | 62.82 |
| Spline-GCN | 73.70 | 47.72 | 63.64 |
| DEXTR | 79.40 | 55.38 | 69.84 |
| Spline-GCN-EXTR | 79.88 | 57.56 | 71.89 |

Ablation Study:

Each component of the model is studied and provided results documented for both Polygon and Spline-GCN in Table 8. Performing iterative inference leads to a significant boost, and adding the boundary branch to the CNN further improves performance.

TABLE 8

| Model | Spline | Polygon |
|---|---|---|
| GCN | 68.55 | 67.79 |
| +Iterative Inference | 70.00 | 70.78 |

TABLE 8-continued

| Model | Spline | Polygon |
|---|---|---|
| +Boundary Pred. | 72.09 | 71.19 |
| +DiffAcc | 73.70 | 72.66 |

Additional Human Input:

In DEXTR per Maninis et al. [K.-K. Maninis, S. Caelles, J. Pont-Tuset, and L. Van Gool. Deep extreme cut: From extreme points to object segmentation. In *CVPR*, 2018], the authors proposed to use 4 extreme points on the object boundary as an effective information provided by the annotator. Compared to just a box, extreme points require 2 additional clicks. The GCN model is compared to DEXTR in this regime, and follows their strategy in how this information is provided to the model. To be specific, points (in the form of a heat map) are stacked with the image, and passed to a CNN. To compare with DEXTR, DeepLab-v2 is used, as per Maninis et al. The models are referred with such input by appending EXTR.

Note that the image crops used in Polygon-RNN, are obtained by extracting an image inside a square box (and not the actual box provided by the annotator). However, due to significant occlusion in Cityscapes, doing so leads to ambiguities, since multiple objects can easily fall in the same box. By providing 4 extreme points, the annotator more accurately points to the target object. To verify how much accuracy is really due to the additional two clicks, an instantiation of the model is tested to which the four corners of the bounding box are provided as input. This is still a 2-click (box) interaction from the user, however, it reduces the ambiguity about which object to annotate. This model is referred to herein by appending BOX.

Since DEXTR labels pixels and thus more easily deals with multiple component instances, another instantiation of the model is proposed which still exploits 4 clicks on average, yet collects these differently. Specifically, the annotator is requested to provide a box around each component, rather than just a single box around the full object. On average, this leads to 2.4 clicks per object. This model is referred to with MBOX. To match the 4-click budget, the annotator clicks on the worst predicted boundary point for each component, which leads to 3.6 clicks per object, on average.

Figure 26:
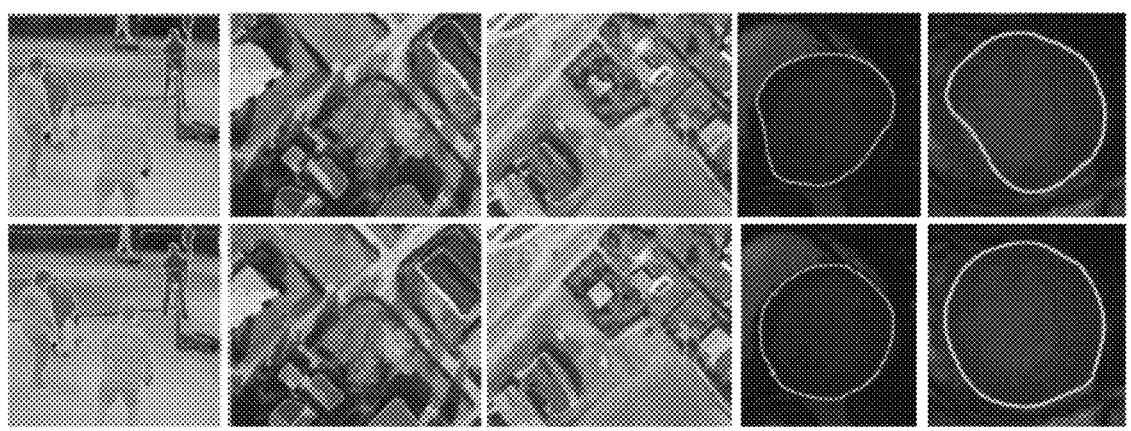
FIG. 26 shows examples of images annotated with an embodiment.

Table 9 shows that in the extreme point regime, the model is already better than DEXTR, whereas the alternative strategy is even better, yielding an 0.8% improvement overall with fewer clicks in average. The method also significantly outperforms DEXTR in the boundary metrics (FIG. 26).

TABLE 9

| Model | Bicycle | Bus | Person | Train | Truck | Mcycle | Car | Rider | Mean | # clicks |
|---|---|---|---|---|---|---|---|---|---|---|
| Spline-GCN-BOX | 69.53 | 84.40 | 76.33 | 69.05 | 85.08 | 68.75 | 83.80 | 73.38 | 76.29 | 2 |
| PSP-DEXTR | 74.42 | 87.30 | 79.30 | 73.51 | 85.42 | 73.69 | 85.57 | 76.24 | 79.40 | 4 |
| Spline-GCN-EXTR | 75.09 | 87.40 | 79.88 | 72.78 | 86.76 | 73.93 | 86.13 | 77.12 | 79.88 | 4 |
| Spline-GCN-MBOX | 70.45 | 88.62 | 75.87 | 76.35 | 82.73 | 70.76 | 83.32 | 73.49 | 77.62 | 2.4 |
| +One click | 73.28 | 89.18 | 78.45 | 79.89 | 85.02 | 74.33 | 85.15 | 76.22 | 80.19 | 3.6 |

Interactive Mode:

For interactive mode, an annotator is simulated correcting vertices, following the protocol discussed above for Polygon RNN++. In particular, the annotator iteratively makes corrections until the IoU is greater than a threshold T, or the model stops improving its prediction. The predicted curve achieving agreement above T is considered as a satisfactory annotation.

Figure 23A:
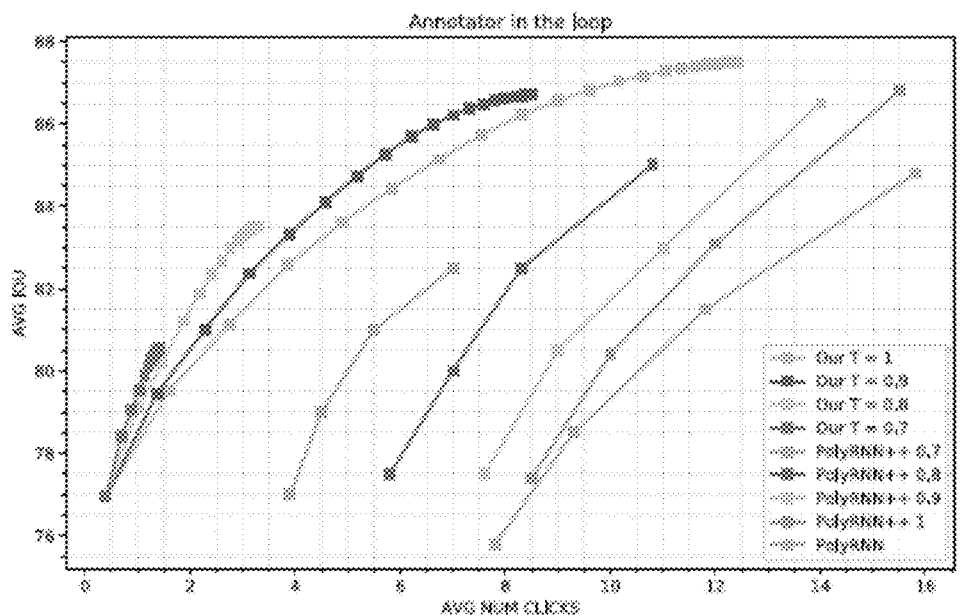
FIG. 23A and FIG. 23B show a representation of experimental results of an embodiment.
Figure 23B:
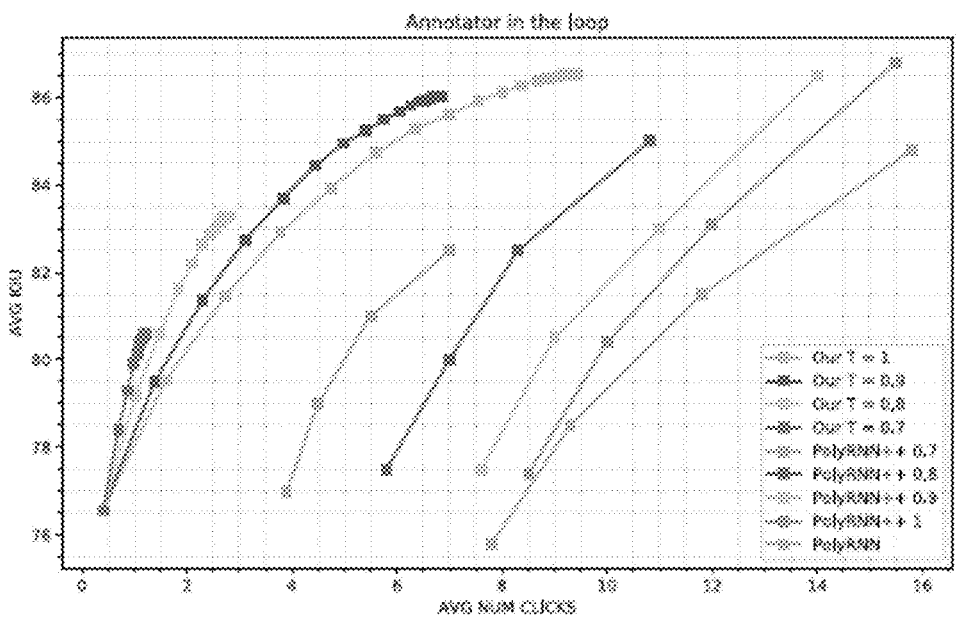
Figure 24:
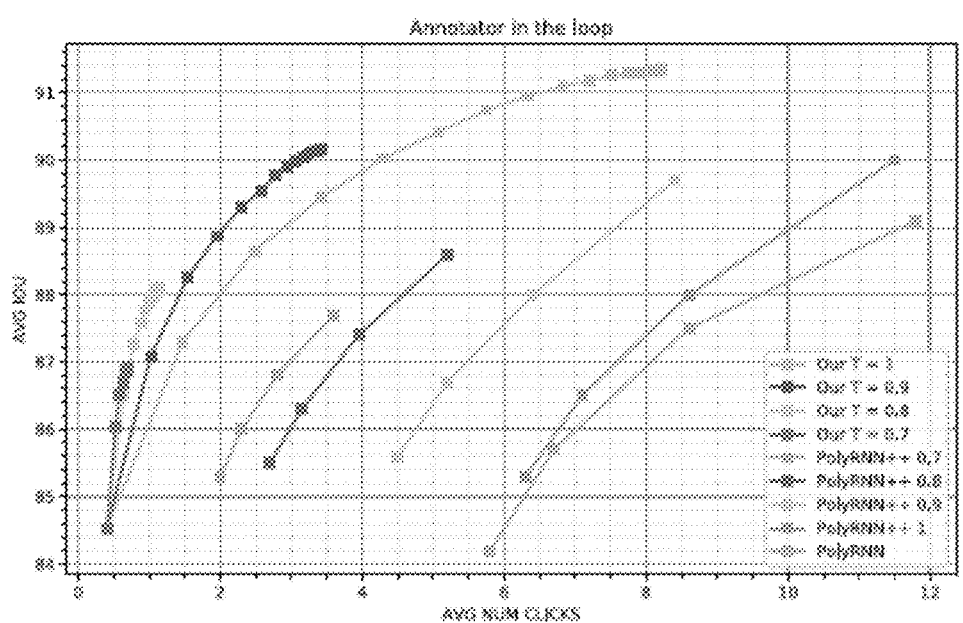
FIG. 24 shows a representation of experimental results of an embodiment.

FIGS. 23A, 23B and 24 show IoU vs number of clicks at different thresholds T. The results are compared to Polygon-RNN++. The results show significant improvements over the baseline, highlighting the model as a more efficient annotation tool. Performance is further analyzed when using 40 vs 20 control points. The version with fewer control points is slightly worse in automatic mode, however, it is almost on par in the interactive mode. This may suggest that coarse-to-fine interactive correction may be the optimal approach.

Inference Times:

Timings are reported in Table 10. The model is an order of magnitude faster than Polygon-RNN++, running at 28.4 ms, while Polygon-RNN++ requires 298.0 ms. In the interactive mode, the model reuses the computed image features computed in the forward pass, and thus only requires 2.6 ms to incorporate each correction. On the other hand, Polygon-RNN requires to run an RNN after every correction, thus still requiring 270 ms.

TABLE 10

| Model | Time (ms) |
|---|---|
| Polygon-RNN++ | 298.0 |
| Polygon-RNN++ (Corr.) | 270.0 |
| Polygon-GCN | 28.7 |
| Spline-GCN | 29.3 |
| Polygon-GCN (Corr.) | 2.0 |
| Spline-GCN (Corr.) | 2.6 |

Cross-Domain Evaluation

The model is evaluated on its ability to generalize to new datasets. Generalization is crucial, in order to effectively annotate a variety of different imagery types. It may be shown that by fine-tuning on only a small set of the new dataset (10%) leads to fast adaptation to new domains.

Following Polygon-RNN++ and using the Cityscapes-trained model and test it on KITTI (in-domain driving dataset), ADE20k (general scenes), Rooftop (aerial imagery), and two medical datasets as previously described.

Quantitative Results.

Figure 25:
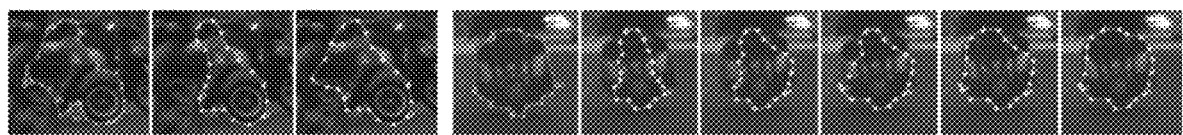
FIG. 25 shows examples of images annotated with an embodiment.

Table 11 provides the results. Simple baselines are adopted from Polygon-RNN++. The models are further fine-tuned (with dif-fAcc) with 10% randomly sampled training data from the new domain. Note that ssTEM does not have a training split, and thus is omitted for this dataset. Results show that the model generalizes better than PSP-DeepLab, and that fine-tuning on very little annotated data effectively adapts the model to new domains. FIG. 25 shows a few qualitative results before and after fine-tuning.

TABLE 11

| Model | KITTI | ADE | Rooftop | Card.MR | ssTEM |
|---|---|---|---|---|---|
| Square Box (Perfect) | — | 69.35 | 62.11 | 79.11 | 66.53 |
| Ellipse (Perfect) | — | 69.53 | 66.82 | 92.44 | 71.32 |
| Polygon-RNN++ (BS) | 83.14 | 71.82 | 65.67 | 80.63 | 53.12 |
| PSP-DeepLab | 83.35 | 72.70 | 57.91 | 74.11 | 47.65 |
| Spline-GCN + finetune | 84.09 | 72.94 | 68.33 | 78.54 | 58.46 |
|  | 84.81 | 77.35 | 78.21 | 91.33 | — |
| Polygon-GCN + finetune | 83.66 | 72.31 | 66.78 | 81.55 | 60.91 |
|  | 84.71 | 77.41 | 75.56 | 90.91 | — |

Thus, the Curve-GCN model may both provide an increase in speed over previous models, as well as enabling interactive corrections which are restricted to being local in effect, thereby providing more control to the annotator.

Alternative Method Embodiment

Figure 27:
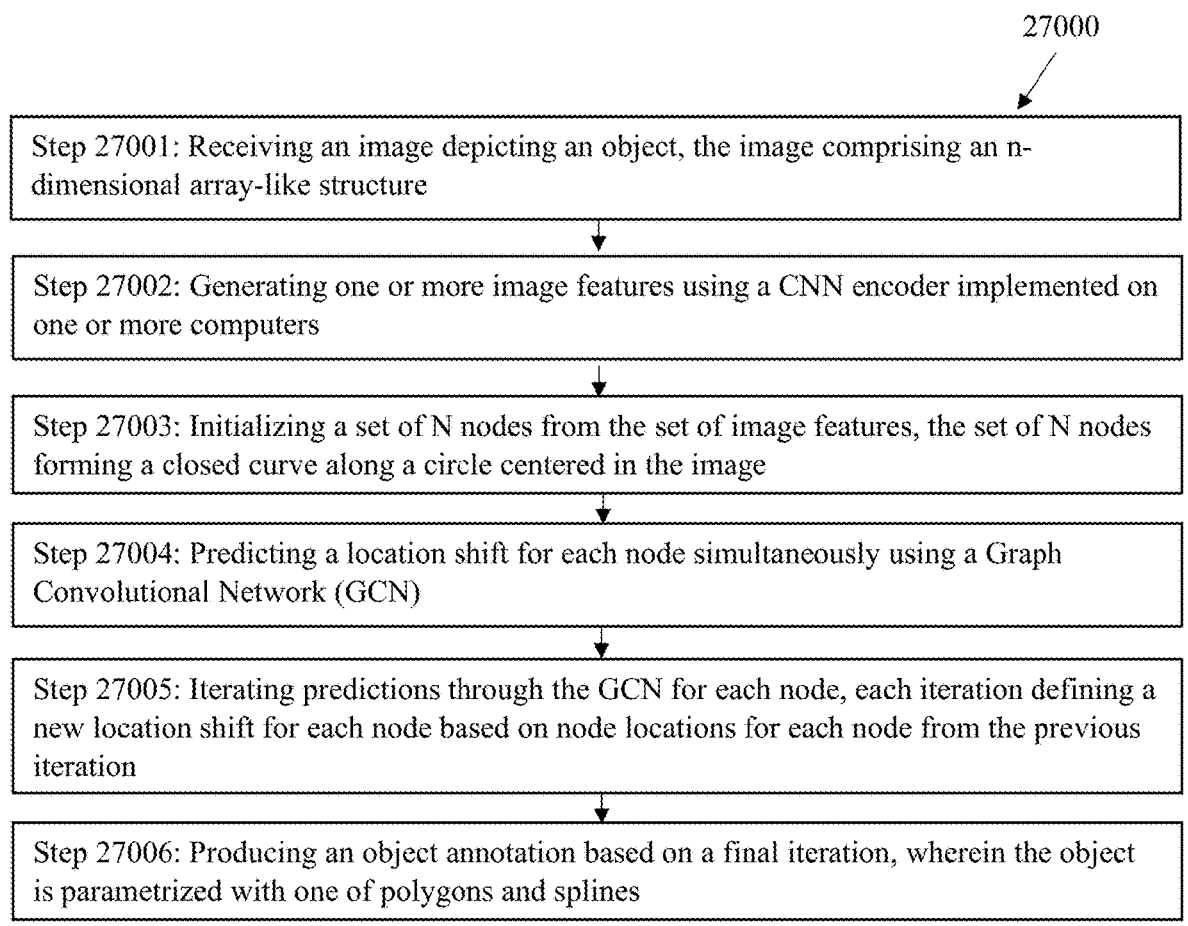
FIG. 27 shows a method of the present invention according to an alternative embodiment.

As shown in FIG. 27, an embodiment of the alternative method 27000 may comprise steps of receiving an image depicting an object, the image comprising an n-dimensional array-like structure 27001, and generating one or more image features using a CNN encoder implemented on one or more computers 27002, initializing a set of N nodes from the set of image features, the set of N nodes forming a closed curve along an ellipse centered in the image 27003, predicting a location shift for each node simultaneously using a Graph Convolutional Network (GCN) 27004, iterating predictions through the GCN for each node, each iteration defining a new location shift for each node based on node locations for each node from the previous iteration 27005, and producing an object annotation based on a final iteration, wherein the object is parametrized with one of polygons and splines 27006.

According to an embodiment, the method includes training and testing with a fixed number of iterations. That number can be arbitrarily changed according to the user's choice.

Alternative System Embodiment

Figure 28:
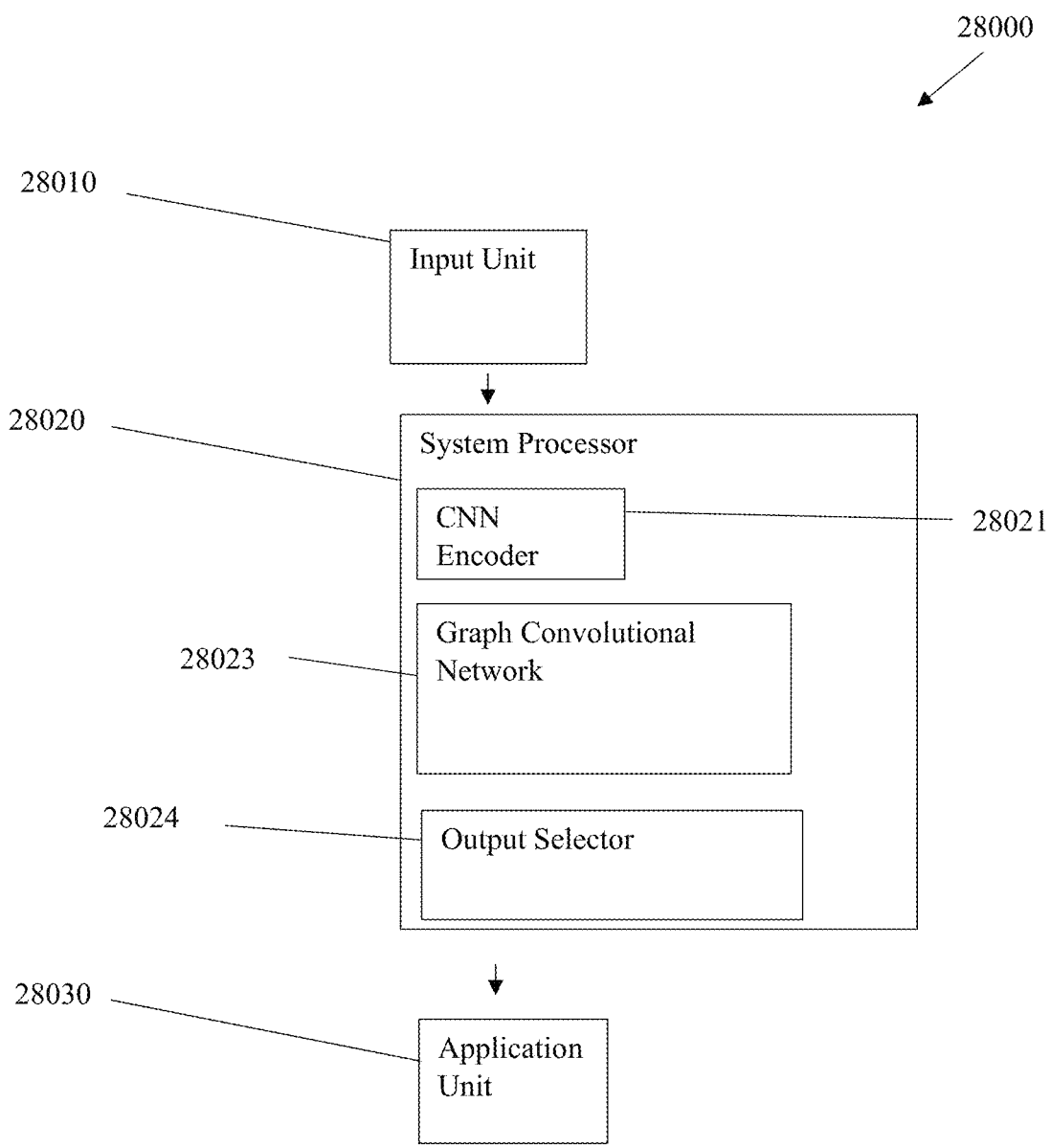
FIG. 28 shows a system of the present invention according to an alternative embodiment.

An embodiment of a system to carry out the alternative method is shown in FIG. 28. In sample system 28000, an input unit 28010 receives an image depicting an object, the image comprising an n-dimensional array-like structure at a computer which includes a system processor 28020 which may comprise processing and other necessary elements distributed across one or more computers for processing the input. At system processor 28020, a CNN encoder 28021 generates one or more image features and initializes a set of N nodes from the set of image features where the set of N nodes forms a closed curve along an ellipse centered in the image and predicts a location shift for each node simultaneously using a GCN 28023. Predictions are iterated through the GCN for each node where each iteration is a separate set of layers of the neural network and each iteration defines a new location shift for each node based on node locations for each node from the previous iteration, eventually producing an object annotation selected by output selector 28024 based on a final iteration, wherein the object is parametrized with one of polygons and splines and provided to output or application unit 28030 such as a computer monitor or other display or an output unit for sending annotated objects to another system for a particular application or use.

Potential use cases for this alternative method and system embodiment may include the delineation of 3D objects from multiple views to generate coarse mesh annotation. Further, household objects or other specified relevant objects (clothing, persons, etc.) may be annotated for robotic perception or other person-related software. Other applications may include completing partially drawn annotations and object selection for photo editing software.

While various elements, blocks, or units are depicted or described as being either independent or as being components of other elements, blocks, or units, in other embodiments other arrangements of elements, blocks or units may be employed.

Various embodiments of the invention have been described in detail. Since changes in and or additions to the above-described best mode may be made without departing from the nature, spirit or scope of the invention, the invention is not to be limited to those details but only by the appended claims. Section headings herein are provided as organizational cues. These headings shall not limit or characterize the invention set out in the appended claims.

What is claimed is:

1. A method of annotating an object, comprising:
receiving an image depicting an object, the image comprising an n-dimensional array-like data structure;
generating a set of image features using a Convolutional Neural Network (CNN) encoder implemented on one or more computers;
initializing a set of N nodes from the set of image features, the set of N nodes forming a closed curve along a circle centered in the image;
predicting a location shift for each node simultaneously using a Graph Neural Network (GNN);
iterating predictions through the GNN for each node, each iteration defining a new location shift for each node based on node locations for each node from the previous iteration; and
producing an object annotation based on a final iteration;
wherein the object is parametrized with one of polygons or splines.

2. The method of claim 1, further comprising applying one or more simulated human corrections or human corrections to one or more nodes during the iteration step.

3. The method of claim 1, wherein the GNN is trained via point matching loss.

4. The method of claim 3, wherein the GNN is further trained and fine-tuned via differentiable accuracy loss.

5. The method of claim 1, wherein a centripetal Catmull-Rom spline is applied for splines.

6. The method of claim 1, wherein the image is selected from one of: an RGB image, a thermal image, a depth image, and a hyperspectral image.

7. The method of claim 1, wherein the final iteration is based on running a pre-selected number of iterations.

8. The method of claim 1, wherein the GNN is a Graph Convolutional Network.

9. A system for object annotation, comprising:
a Convolutional Neural Network (CNN), encoder implemented by one or more computers for generating a set of image features from a received image, the image comprising an n-dimensional array-like data structure, and for initializing a set of N nodes from the set of image features, the set of N nodes forming a closed curve along a circle centered in the image;
a Graph Neural Network (GNN) implemented by one or more computers for predicting a location shift for each node simultaneously and iterating predictions through the GNN for each node, each iteration defining a new location shift for each node based on node locations for each node from the previous iteration; and an output selector for producing an output based on a final iteration from the GNN.

10. The system of claim 9, further comprising a human input interface for receiving one or more human corrections to one or more nodes during the iteration.

11. The system of claim 9, further comprising a training system implemented by one or more computers for training the GNN.

12. The system of claim 11, wherein the training system applies a point matching loss training method or a differentiable accuracy loss method.

13. The system of claim 11, wherein the training system applies simulated human corrections or human corrections.

14. The system of claim 11, wherein the final iteration is based on running a pre-selected number of iterations.

15. The system of claim 9, wherein the GNN is a Graph Convolutional Network.

* * * * *